United States Patent
Ahn et al.

(10) Patent No.: US 8,873,497 B2
(45) Date of Patent: Oct. 28, 2014

(54) APPARATUS AND METHOD FOR TRANSMITTING INFORMATION ON POWER HEADROOM IN MULTIPLE COMPONENT CARRIER SYSTEM

(75) Inventors: Jae Hyun Ahn, Seoul (KR); Ki Bum Kwon, Seoul (KR)

(73) Assignee: Pantech Co., Ltd., Seoul (KR)

( * ) Notice: Subject to any disclaimer, the term of this patent is extended or adjusted under 35 U.S.C. 154(b) by 92 days.

(21) Appl. No.: 13/805,267

(22) PCT Filed: Sep. 29, 2011

(86) PCT No.: PCT/KR2011/007174
§ 371 (c)(1),
(2), (4) Date: Dec. 18, 2012

(87) PCT Pub. No.: WO2012/044081
PCT Pub. Date: Apr. 5, 2012

(65) Prior Publication Data
US 2013/0089062 A1    Apr. 11, 2013

(30) Foreign Application Priority Data
Sep. 30, 2010 (KR) .......... 10-2010-0094919

(51) Int. Cl.
H04W 4/00 (2009.01)
H04W 52/36 (2009.01)
H04W 52/58 (2009.01)
H04W 52/34 (2009.01)

(52) U.S. Cl.
CPC .......... *H04W 52/365* (2013.01); *Y02B 60/50* (2013.01); *H04W 52/58* (2013.01); *H04W 52/34* (2013.01)
USPC .......................................... 370/329

(58) Field of Classification Search
USPC .......................... 370/329, 330, 331
See application file for complete search history.

(56) References Cited

U.S. PATENT DOCUMENTS

| | | |
|---|---|---|
| 2008/0130589 A1 | 6/2008 | Gorokhov et al. |
| 2008/0175185 A1 | 7/2008 | Ji et al. |
| 2010/0173665 A1 | 7/2010 | Michel et al. |

(Continued)

FOREIGN PATENT DOCUMENTS

| | | |
|---|---|---|
| KR | 10-2008-0069649 | 7/2008 |
| KR | 10-2009-0057090 | 6/2009 |

(Continued)

OTHER PUBLICATIONS

International Search Report dated Apr. 12, 2012 issued for PCT/KR2011/007174.

*Primary Examiner* — Mohammad Anwar
(74) *Attorney, Agent, or Firm* — H.C. Park & Associates, PLC

(57) ABSTRACT

There are provided an apparatus and method for transmitting information about power headroom in a multi-component carrier system. There is disclosed a method of configuring a plurality of component carriers combined from a candidate component carrier group, based on component carrier configuration information, triggering a power headroom report on the plurality of combined component carriers, calculating power headroom for the plurality of combined component carriers and transmitting combination power headroom information, including a value of the calculated power headroom, to a eNodeB. The power headroom report is triggered, when the power headroom on the plurality of combined component carriers is greater than or equal to a predefined threshold. Accordingly, uplink signaling overhead can be reduced because a power headroom report can be semi-persistently made without the need to additionally send information about the combination component carrier.

16 Claims, 14 Drawing Sheets

(56) References Cited

U.S. PATENT DOCUMENTS

2010/0208749 A1* 8/2010 Chun et al. .................... 370/474
2011/0092217 A1* 4/2011 Kim et al. .................... 455/450

FOREIGN PATENT DOCUMENTS

| KR | 10-2009-0077835 | 7/2009 |
| KR | 10-2010-0041775 | 4/2010 |

* cited by examiner

[Figure 1]
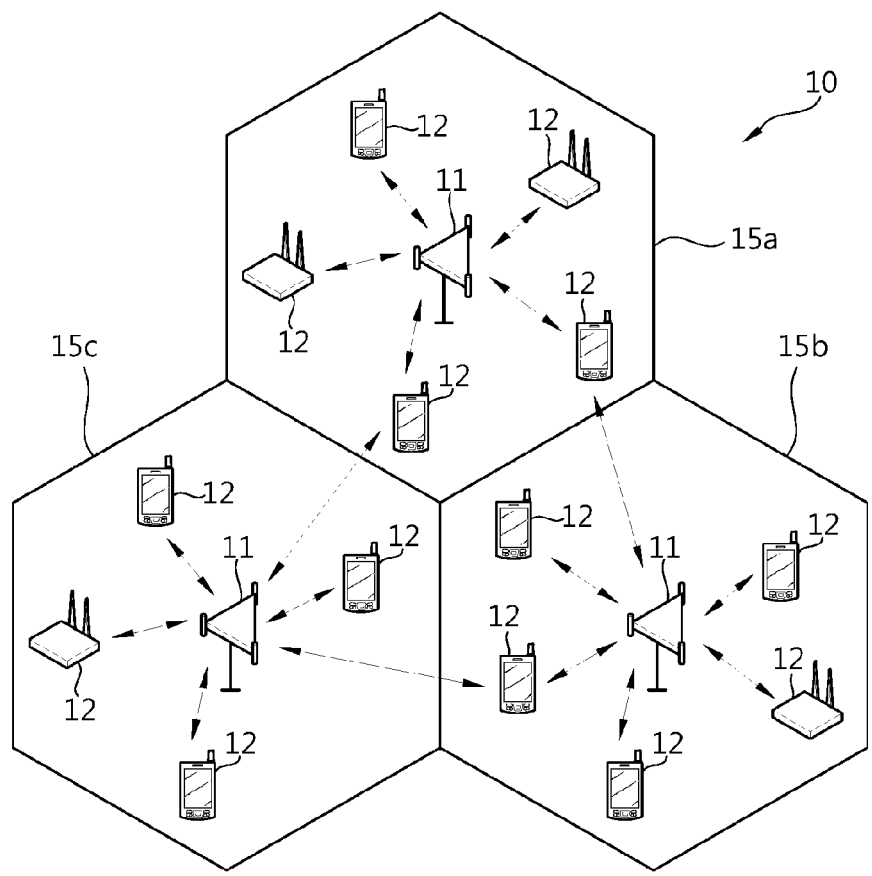
[Figure 2]
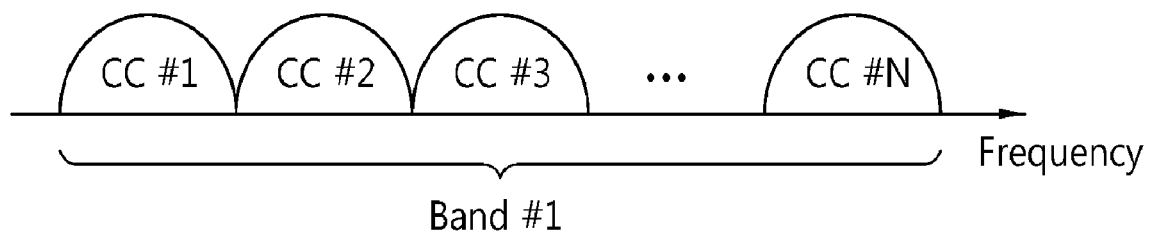

[Figure 3]
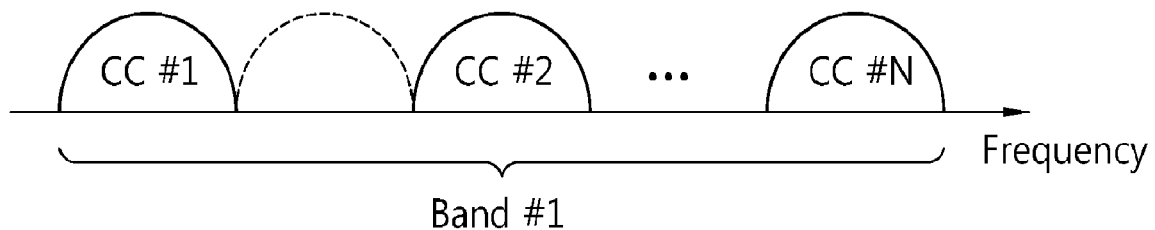
[Figure 4]
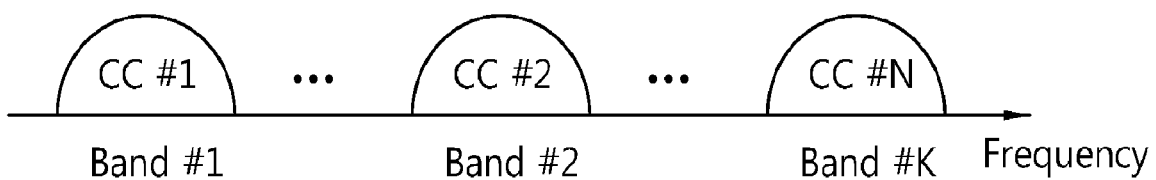
[Figure 5]
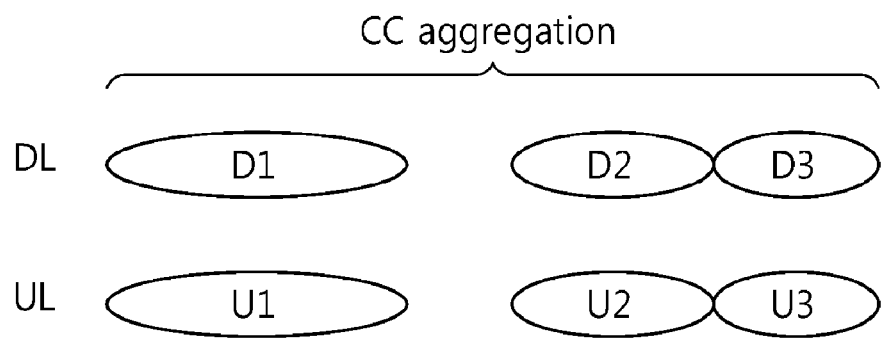

【Figure 6】
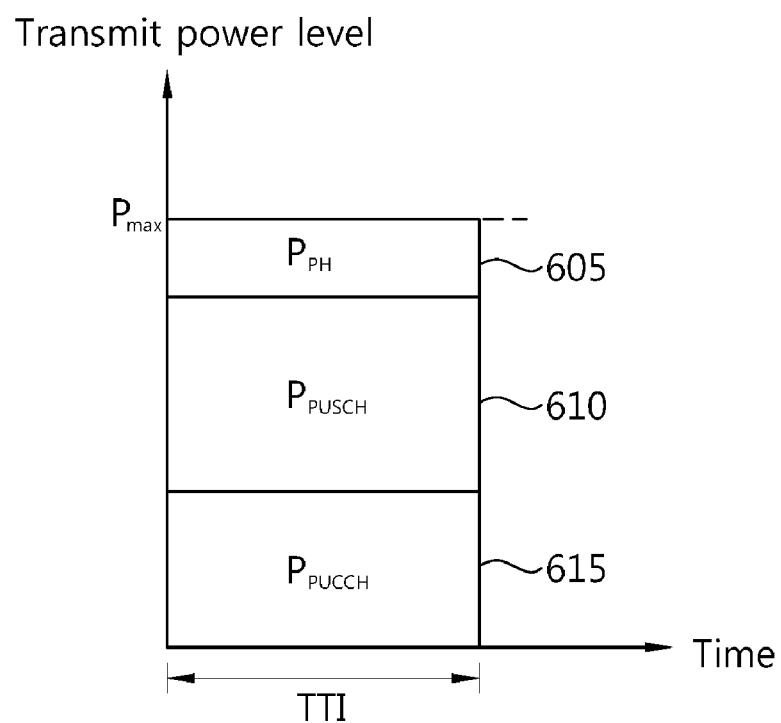

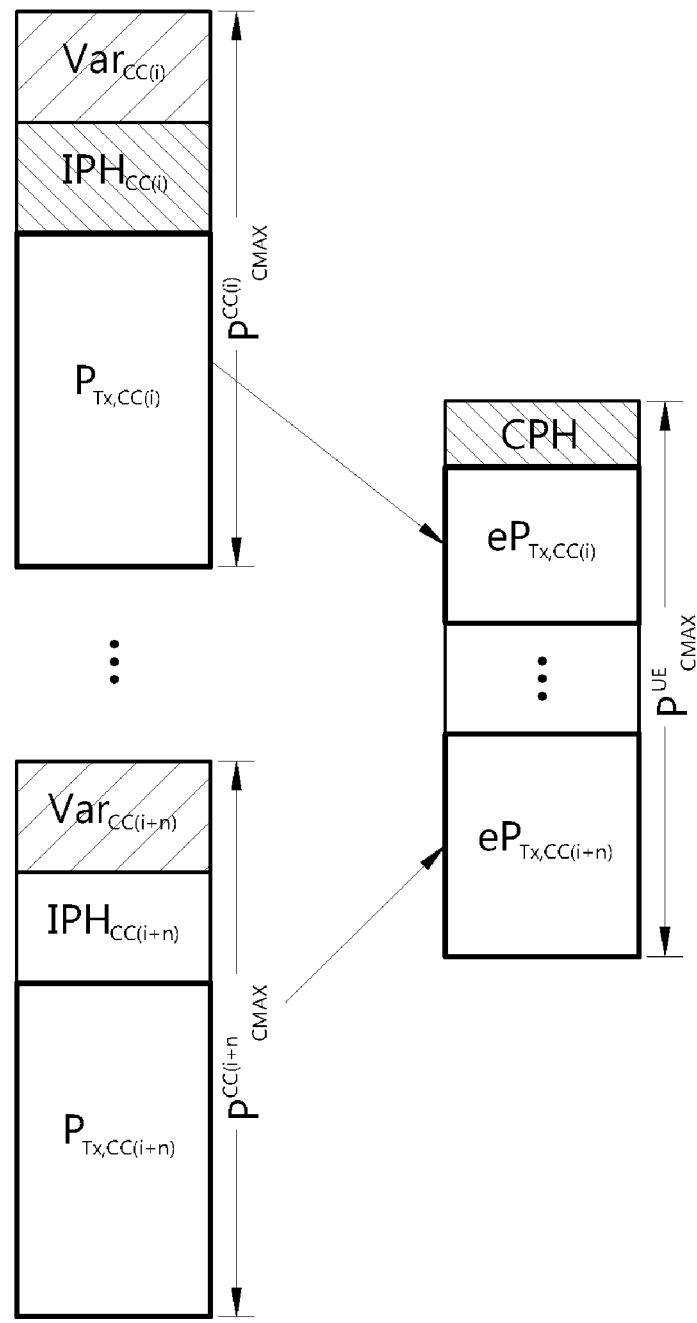
[Figure 7]

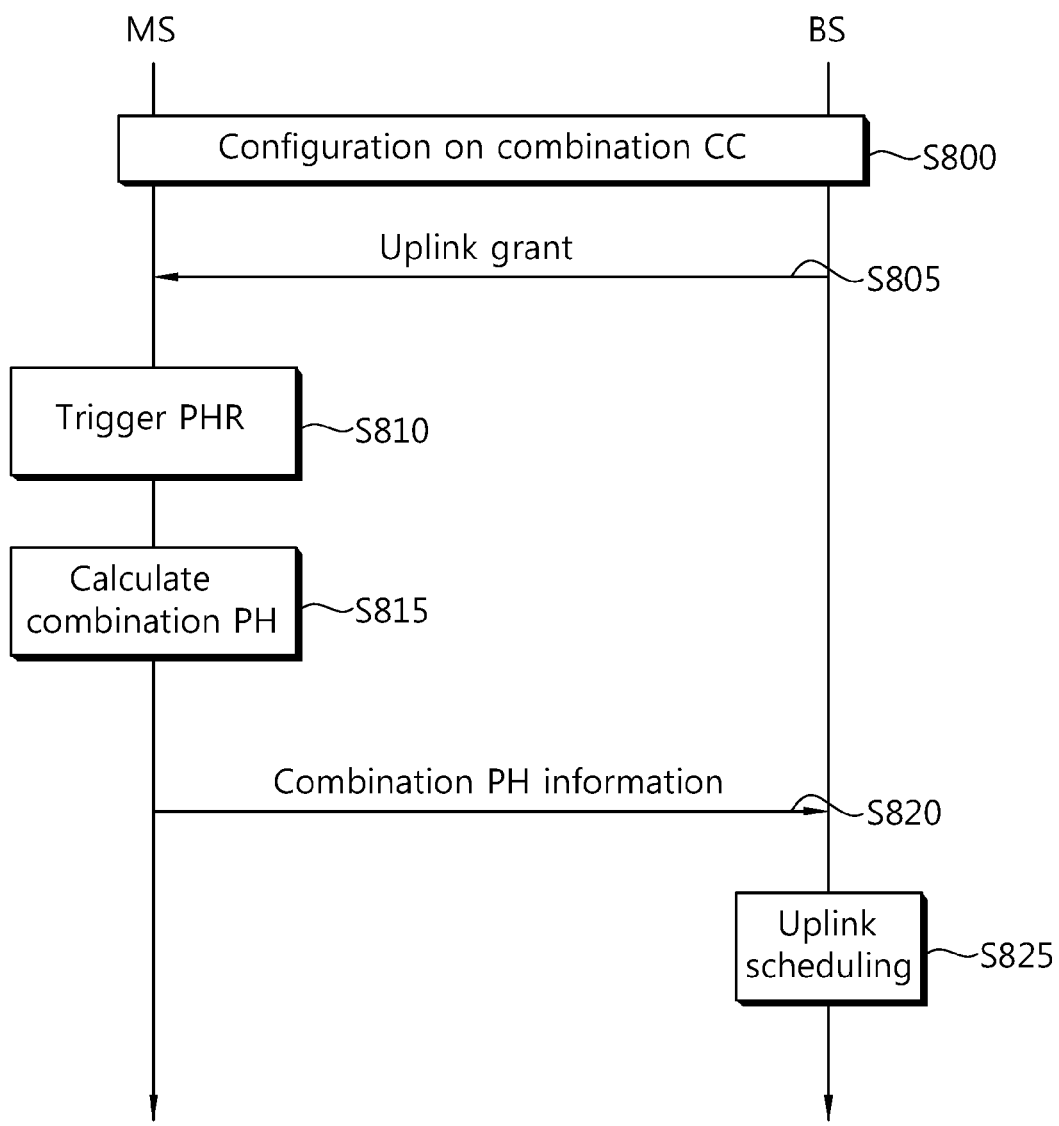
[Figure 8]

[Figure 9]
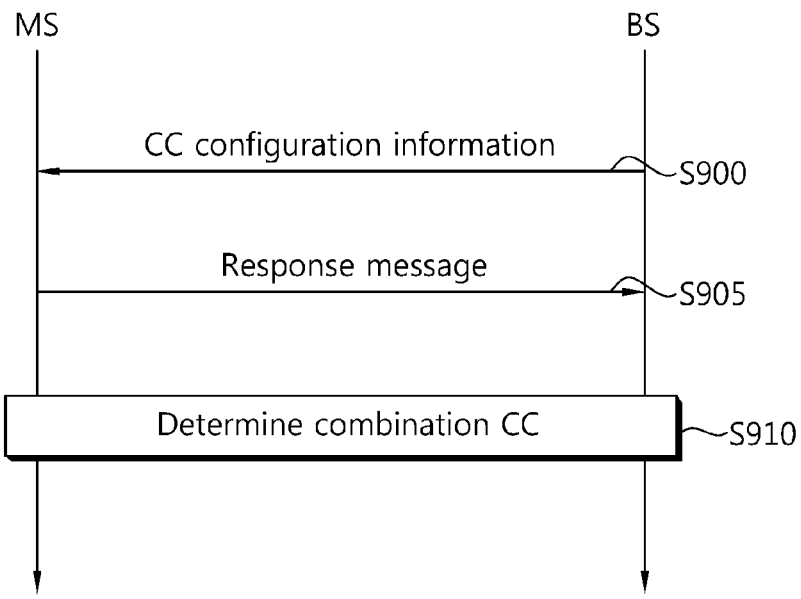
[Figure 10]
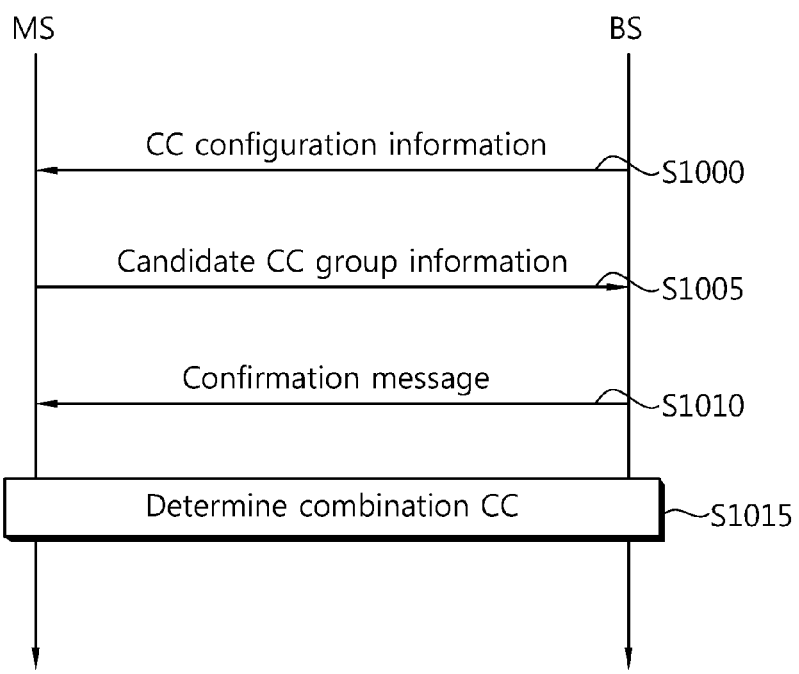

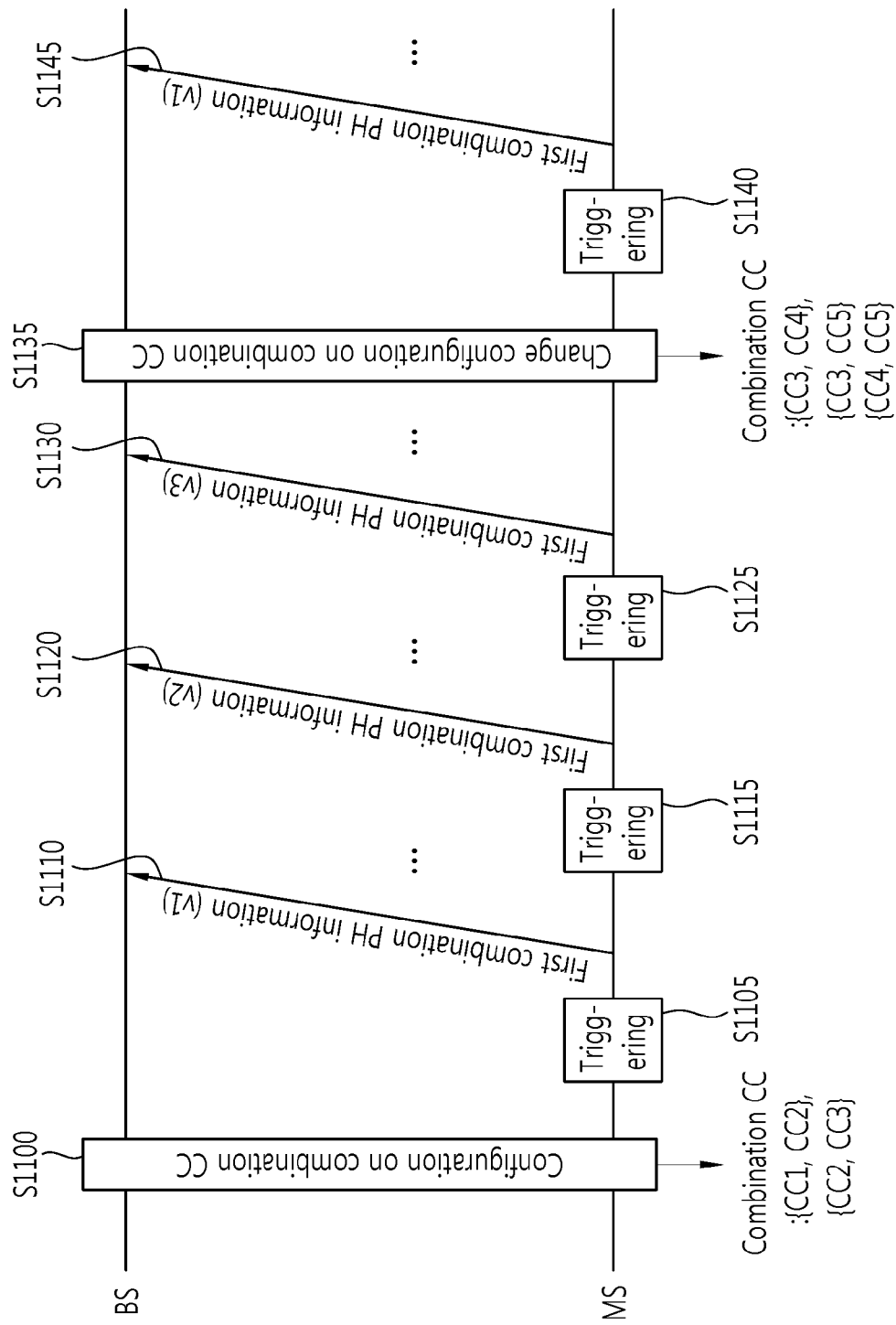

[Figure 12]
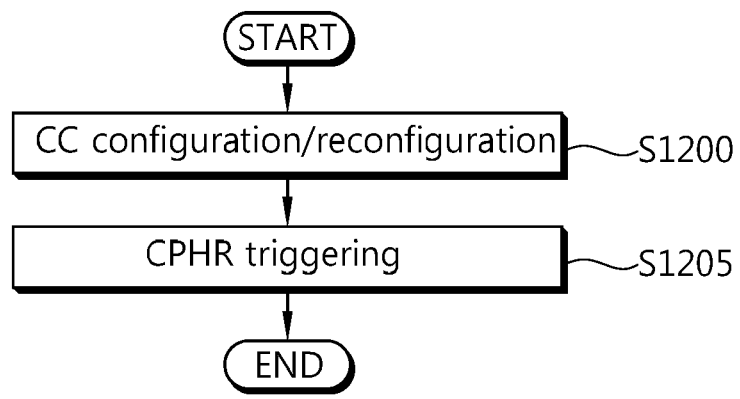
[Figure 13]
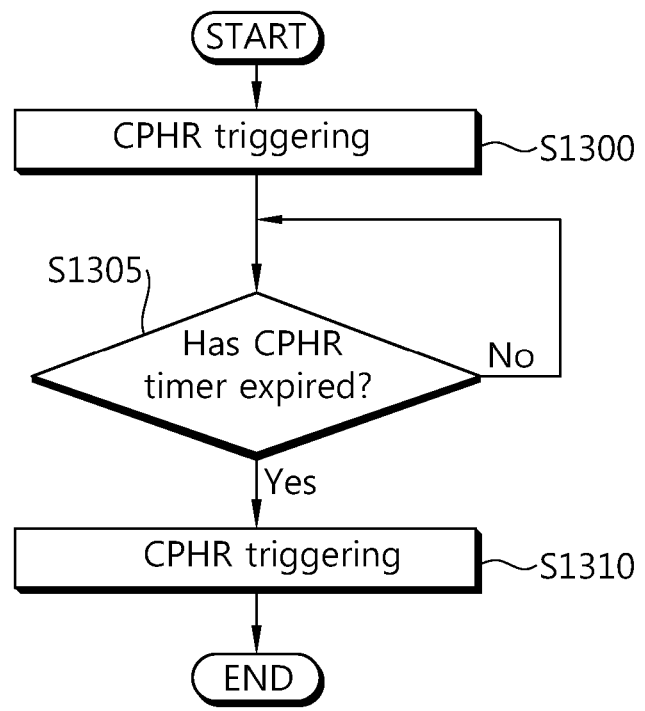

[Figure 14]
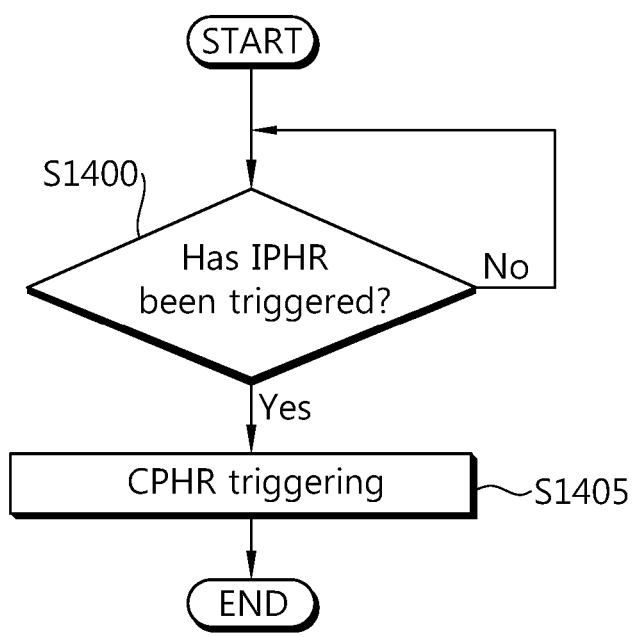

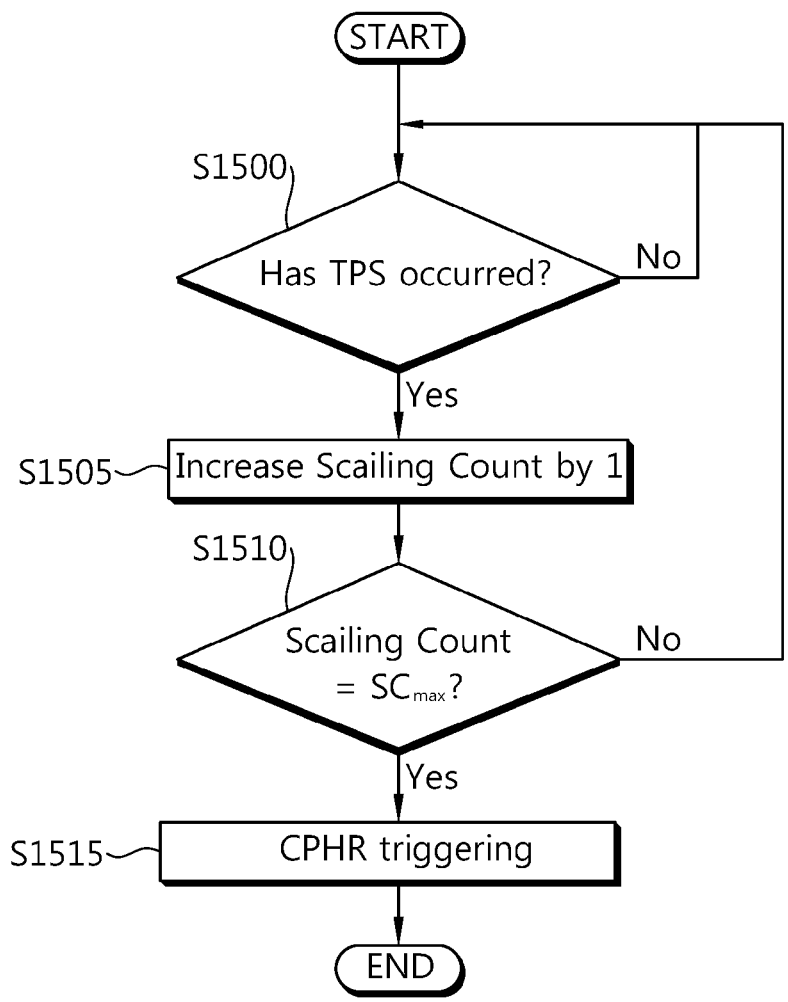
[Figure 15]

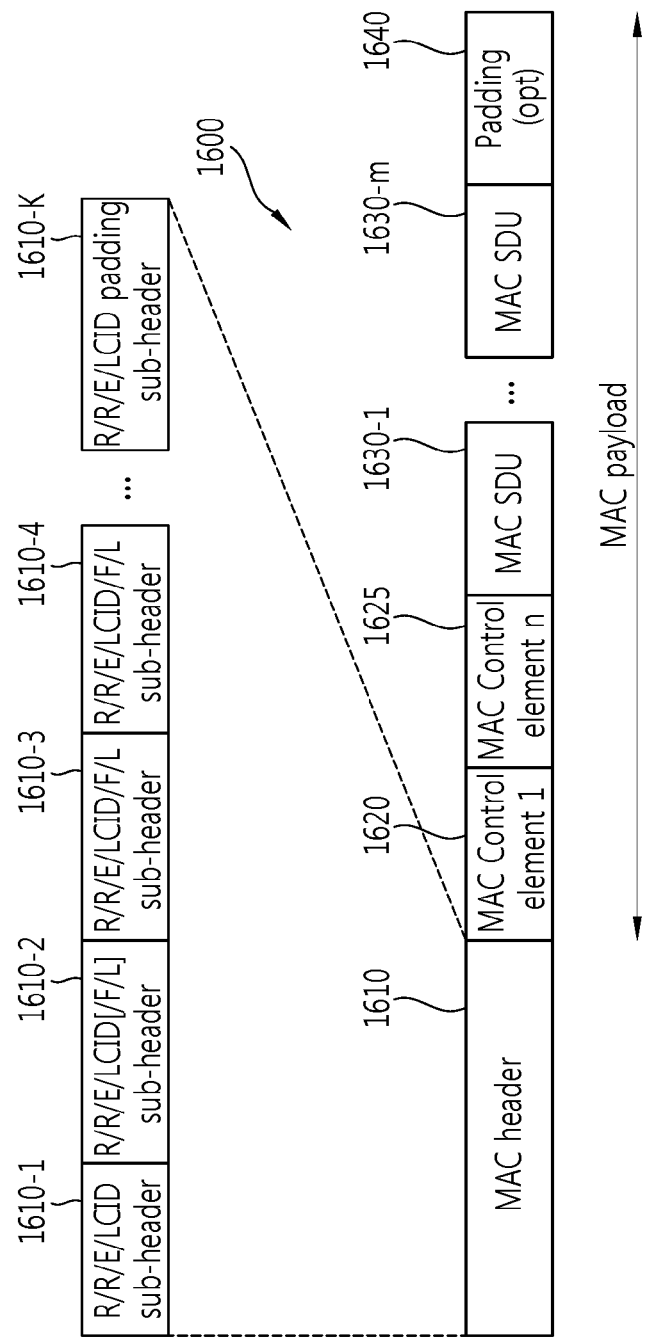
[Figure 16]

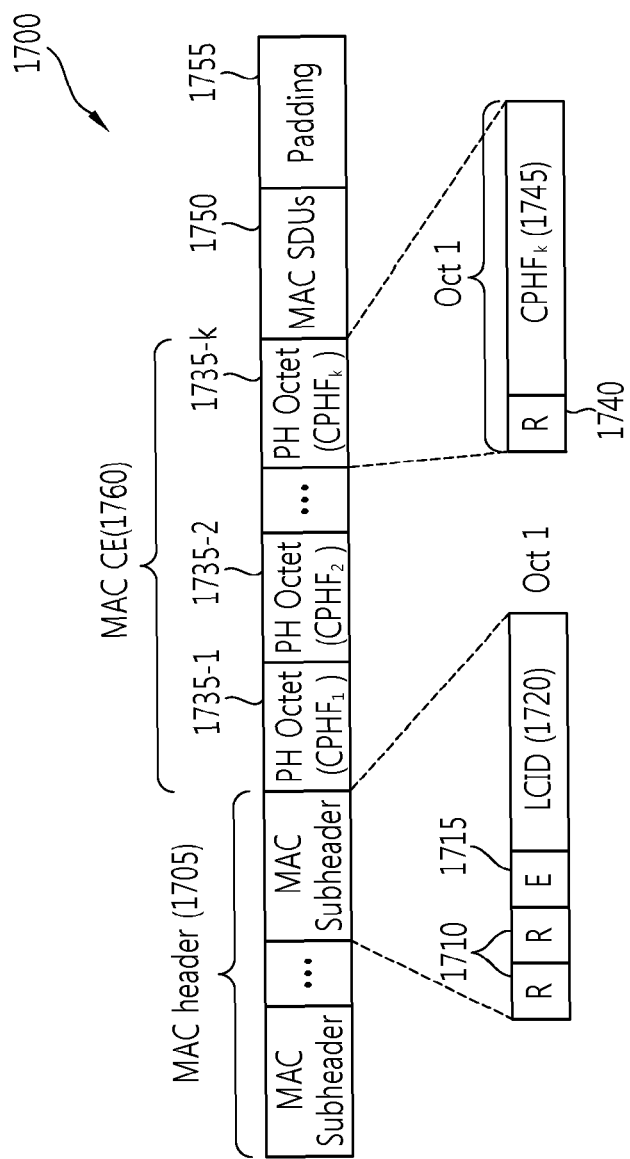
[Figure 17]

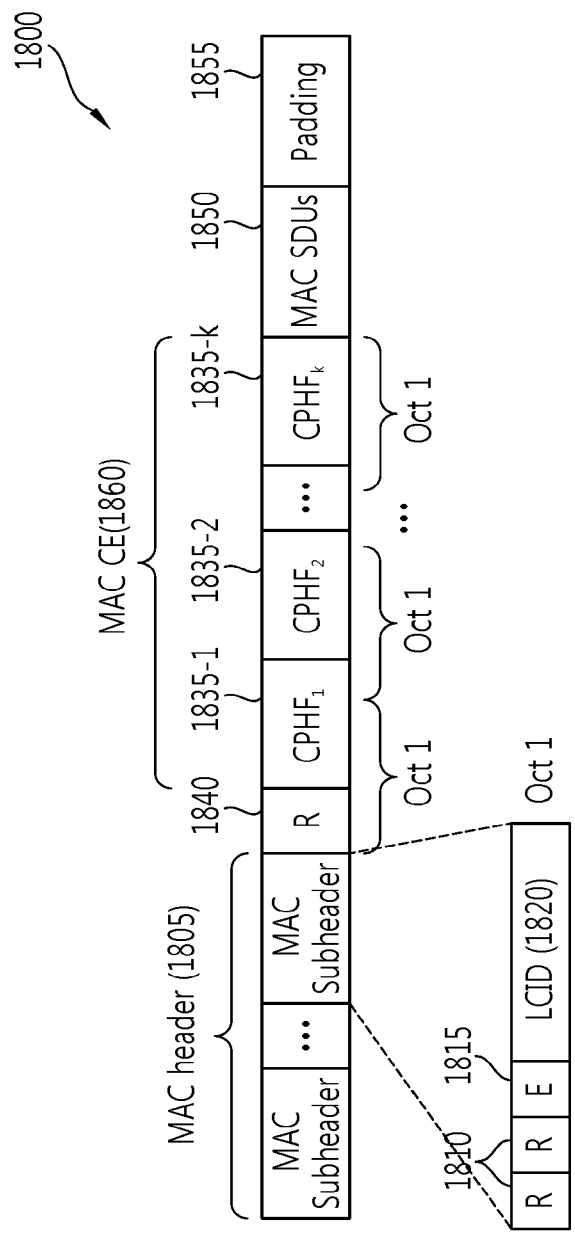
[Figure 18]

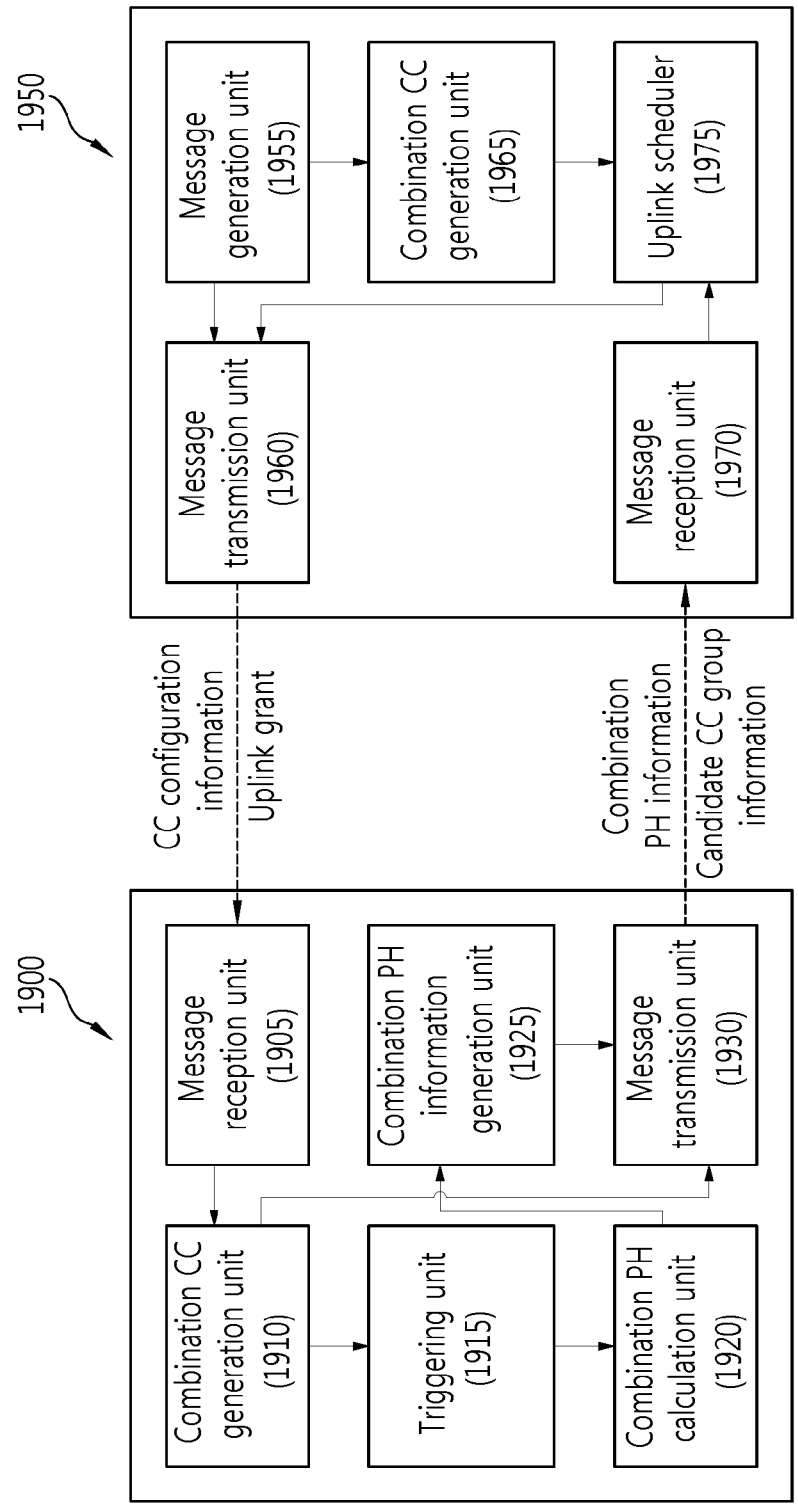
[Figure 19]

APPARATUS AND METHOD FOR TRANSMITTING INFORMATION ON POWER HEADROOM IN MULTIPLE COMPONENT CARRIER SYSTEM

CROSS-REFERENCE TO RELATED APPLICATIONS

This application is the National Stage Entry of International Application No. PCT/KR2011/007174, filed on Sep. 29, 2011 and claims priority from and the benefit of Korean Patent Application No. 10-2010-0094919, filed on Sep. 30, 2010, both of which are hereby incorporated by reference for all purposes as if fully set forth herein

BACKGROUND

1. Field

The present invention relates to wireless communication, and more particularly, to an apparatus and method for transmitting information about power headroom in a multi-component carrier system.

2. Discussion of the Background

A wireless communication system uses one bandwidth for data transmission. For example, the $2^{nd}$ generation wireless communication system uses a bandwidth of 200 KHz to 1.25 MHz, and the $3^{rd}$ generation wireless communication system uses a bandwidth of 5 MHz to 10 MHz. In order to support an increasing transmission capacity, the bandwidth of the recent 3GPP LTE or 802.16m continues to be extended up to 20 MHz or higher. To increase the bandwidth may be considered to be essential so as to increase the transmission capacity, but to support a great bandwidth even when the level of required Quality of Service (QoS) is low may generate great power consumption.

In order to solve the problem, there has emerged a multi-component carrier system in which a component carrier having one bandwidth and the center frequency is defined and data is transmitted or received in a wide band through a plurality of component carriers. That is, a narrow band and a wide band are supported at the same time by using one or more component carriers. For example, if one component carrier corresponds to a bandwidth of 5 MHz, a maximum 20 MHz bandwidth can be supported by using four component carriers.

A method of a base station efficiently using the resources of a mobile station is to use power headroom information provided by the mobile station. The power headroom information is essential information for efficiently allocating uplink resources in wireless communication and reducing the battery consumption of a mobile station. When the mobile station provides the power headroom information to the base station, the base station can estimate maximum transmission power in uplink that the mobile station can withstand. Accordingly, the base station can perform uplink scheduling within the range of the estimated maximum transmission power in uplink.

Power headroom for each component carrier has a relatively small variance. Meanwhile, when a plurality of component carriers is dynamically scheduled, the variance may become relatively great. For this reason, the power headrooms of the component carriers must be taken into account individually or overall.

SUMMARY

An object of the present invention is to provide an apparatus and method for transmitting combination Power Headroom (combination PH) information in a multi-component carrier system.

Another object of the present invention is to provide an apparatus and method for receiving combination PH information in a multi-component carrier system.

Yet another object of the present invention is to provide an apparatus and method for performing dynamic uplink scheduling based on combination PH information.

Still yet another object of the present invention is to provide a method of recognizing combination PH only using the sequence of values of combination PHs although an indicator for a combination CC does not exist.

Still yet another object of the present invention is to provide an apparatus and method for configuring a candidate CC combination set.

Still yet another object of the present invention is to provide an apparatus and method for semi-persistently transmitting combination PH information even without changing a format of the combination PH information.

Still yet another object of the present invention is to provide a triggering apparatus and method for triggering a CPHR.

According to an aspect of the present invention, there is provided a method of a user equipment transmitting power headroom information in a multi-component carrier system. The method includes configuring a plurality of component carriers combined from a candidate component carrier group, based on component carrier configuration information, triggering a power headroom report on the plurality of combined component carriers, calculating power headroom for the plurality of combined component carriers and transmitting combination power headroom information, including a value of the calculated power headroom, to a eNodeB, The power headroom report is triggered, when the power headroom on the plurality of combined component carriers is greater than or equal to a predefined threshold.

According to another aspect of the present invention, there is provided a method of a base station receiving power headroom information in a multi-component carrier system. The method includes transmitting component carrier configuration information regarding a component carrier group, configured in a user equipment, to the user equipment, determining combined component carriers from a candidate component carrier group which is a subset of the configured component carrier group, and receiving combination power headroom information, including a value of power headroom regarding the combined component carriers, from the user equipment.

The amount of the combination power headroom information transmitted whenever triggering is generated is the same until the construction of the plurality of combined component carriers is reconfigured.

According to yet another aspect of the present invention, there is provided a user equipment. The user equipment includes a message reception unit for receiving component carrier configuration information or an uplink grant from a eNodeB, a combination component carrier generation unit for generating a combination component carrier from the component carrier configuration information, a triggering unit for triggering a combination power headroom report regarding the combination component carrier based on a triggering condition, a combination power headroom calculation unit for calculating combination power headroom regarding the combination component carrier, a combination power headroom information generation unit for generating combination power headroom information having an identical amount whenever triggering is generated until a construction of the combination component carrier is reconfigured based on the calculated combination power headroom, and a message transmission unit for transmitting the generated combination power headroom information to a eNodeB in a form of an RRC message or an MAC message based on the uplink grant.

According to still yet another aspect of the present invention, there is provided a eNodeB. The eNodeB includes a message generation unit for generating component carrier configuration information including a component carrier group configured in a user equipment, a message transmission unit for transmitting the component carrier configuration information or an uplink grant to the user equipment, a combination component carrier generation unit for generating all possible cases of combination component carriers based on the configured component carrier group or based on a candidate component carrier group, a message reception unit for receiving information about the candidate component carrier group and combination power headroom information about the combination component carrier from the user equipment, and an uplink scheduler for generating the uplink grant according to dynamic uplink scheduling for the user equipment based on the combination power headroom information.

In accordance with the present invention, in a multi-component carrier system, a combination PH for a combination CC is provided to a eNodeB. Accordingly, the eNodeB can obtain accurate PH in a dynamic scheduling environment, and reliable uplink transmission can be induced.

BRIEF DESCRIPTION OF THE DRAWINGS

FIG. 1 is shows a wireless communication system;

FIG. 2 is an explanatory diagram illustrating an intra-band contiguous carrier aggregation;

FIG. 3 is an explanatory diagram illustrating an intra-band non-contiguous carrier aggregation;

FIG. 4 is an explanatory diagram illustrating an inter-band carrier aggregation;

FIG. 5 shows a linkage between a DL CC (downlink component carrier) and a UL CC (uplink component carrier) in a multi-carrier system;

FIG. 6 is a graph showing an example of Power Headroom (PH) PH to which the present invention is applied in the time-frequency axis;

FIG. 7 is an explanatory diagram illustrating a concept of combination PH according to an example of the present invention;

FIG. 8 is a flowchart illustrating a method of transmitting PH according to an example of the present invention;

FIG. 9 is a flowchart illustrating a method of configuring a combination CC according to an example of the present invention;

FIG. 10 is a flowchart illustrating a method of configuring a combination CC according to another example of the present invention;

FIG. 11 is a flowchart illustrating a method of transmitting combination PH information according to an example of the present invention;

FIG. 12 is a flowchart illustrating a triggering condition on a Combination Power Headroom Report (CPHR) according to an example of the present invention;

FIG. 13 is a flowchart illustrating a triggering condition on a CPHR according to another example of the present invention;

FIG. 14 is a flowchart illustrating a triggering condition on a CPHR according to yet another example of the present invention;

FIG. 15 is a flowchart illustrating a triggering condition on a CPHR according to still yet another example of the present invention;

FIG. 16 shows the architecture of a Medium Access Control Protocol Data Unit (MAC PDU) including combination PH information according to an example of the present invention;

FIG. 17 shows the architecture of an MAC PDU including combination PH information according to another example of the present invention;

FIG. 18 shows the architecture of an MAC PDU including combination PH information according to yet another example of the present invention; and FIG. 19 is a block diagram showing a Mobile Station (MS) for transmitting combination PH information and a Base Station (BS) for receiving combination PH information according to an example of the present invention.

DETAILED DESCRIPTION OF THE ILLUSTRATED EMBODIMENTS

Hereinafter, in this specification, some embodiments of the present invention will be described in detail with reference to some exemplary drawings. It is to be noted that in assigning reference numerals to respective elements in the drawings, the same reference numerals designate the same elements although the elements are shown in different drawings. Furthermore, in describing the present invention, a detailed description of the known functions and constructions will be omitted if it is deemed to make the gist of the present invention unnecessarily vague.

Furthermore, in describing the elements of this specification, terms, such as the first, second, A, B, a, and b, may be used. However, the terms are used to only distinguish one element from the other element, but the essence, order, and sequence of the elements are not limited by the terms. Furthermore, in the case in which one element is described to be "connected", "coupled", or "jointed" to the other element, the one element may be directly connected or coupled to the other element, but it should be understood that a third element may be "connected", "coupled", or "jointed" between the two elements.

Furthermore, in this specification, a wireless communication network is chiefly described. Tasks performed in the wireless communication network may be performed in a process of a system (for example, a base station), managing the wireless communication network, controlling the network and transmitting data or may be performed by a mobile station coupled to the network.

FIG. 1 is shows a wireless communication system.

Referring to FIG. 1, the wireless communication systems 10 are widely deployed in order to provide a variety of communication services, such as voice and packet data. The wireless communication system 10 includes one or more Base Stations (BS) 11. Each BS 11 provides communication services to specific geographical areas (typically called cells 15a, 15b, and 15c. The cell may be classified into a plurality of areas (called a sector).

A Mobile Stations (MS) 12 may be fixed or mobile and may also be called another terminology, such as UE (User Equipment), an MT (Mobile Terminal), a UT (User Terminal), an SS (Subscriber Station), a wireless device, a PDA (Personal Digital Assistant), a wireless modem, or a handheld device.

The BS 11 refers to a fixed station communicating with the MS 12, and it may also be called another terminology, such as eNodeB (evolved NodeB: eNB), a BTS (Base Transceiver System), or an access point. The cell should be interpreted as a comprehensive meaning indicating some areas covered by the BS 11, and it has a meaning to comprehensively cover various coverage areas, such as a mega cell, a macro cell, a micro cell, a pico cell, and a femto cell.

Hereinafter, downlink (DL) refers to communication from the BS 11 to the MS 12, and uplink (UL) refers to communication from the MS 12 to the BS 11. In downlink, a transmitter may be a part of the BS 11, and a receiver may be a part of the MS 12.

In uplink, a transmitter may be a part of the MS 12, and a receiver may be a part of the BS 11.

There are no limits to multiple access schemes applied to the wireless communication system. A variety of multiple access schemes, such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, and OFDM-CDMA, may be used.

The layers of a radio interface protocol between an MS and a network may be classified into a first layer L1, a second layer L2, and a third layer L3 on the basis of three lower layers of an Open System Interconnection (OSI) which has been widely known in the communication systems.

A physical layer (i.e., the first layer) is connected to a higher Medium Access Control (MAC) layer through a transport channel. Data between the MAC layer and the physical layer is moved through the transport channel. Furthermore, data between different physical layer (i.e., the physical layers on the transmission side and on the reception side) is moved through a physical channel. There are some control channels used in the physical layer. A Physical Downlink Control Channel (PDCCH) through which physical control information is transmitted informs a UE of the resource allocation of a PCH (paging channel) and a downlink shared channel (DL-SCH) and Hybrid Automatic Repeat Request (HARQ) information related to the DL-SCH. The PDCCH may carry an uplink grant, informing a UE of the allocation of resources for uplink transmission. A Physical Control Format Indicator Channel (PCFICH) is used to inform a UE of the number of OFDM symbols used in the PDCCHs and is transmitted every frame. A Physical Hybrid ARQ Indicator Channel (PHICH) carries HARQ ACK/NAK signals in response to uplink transmission. A Physical Uplink Control Channel (PUCCH) carries HARQ ACK/NAK signals for downlink transmission, a scheduling request, and uplink control information, such as a Channel Quality Indicator (CQI). A Physical Uplink Shared Channel (PUSCH) carries a UL-SCH (uplink shared channel).

A situation in which an MS transmits a PUCCH or a PUSCH is as follows.

An MS configures a PUCCH for one or more pieces of information about CQI (Channel Quality Information), a PMI (Precoding Matrix Index) selected based on measured space channel information, and an RI (Rank Indicator) and periodically transmits the configure PUCCH to a BS. Furthermore, the MS receives downlink data from the BS and must send ACK/NACK (Acknowledgement/non-Acknowledgement) information about the downlink data to the BS after a certain number of subframes. For example, if downlink data is received in an $n^{th}$ subframe, the MS transmits a PUCCH, composed of ACK/NACK information about the downlink data, in an $(n+1)^{th}$ subframe. If ACK/NACK information cannot be all transmitted on a PUCCH allocated by the BS or if a PUCCH on which ACK/NACK information can be transmitted is not allocated by the BS, the MS may carry the ACK/NACK information on a PUSCH.

A radio data link layer (i.e., the second layer) includes an MAC layer, an RLC layer, and a PDCP layer. The MAC layer is a layer responsible for mapping between a logical channel and a transport channel. The MAC layer selects a proper transport channel suitable for sending data received from the RLC layer and adds necessary control information to the header of an MAC PDU (Protocol Data Unit). The RLC layer is placed over the MAC layer and configured to support reliable data transmission. Furthermore, the RLC layer segments and concatenates RLC SDUs (Service Data Units) received from a higher layer in order to configure data having a size suitable for a radio section. The RLC layer of a receiver supports a data reassembly function for recovering original RLC SDUs from received RLC PDUs. The PDCP layer is used only in a packet exchange region, and it can compress and send the header of an IP packet in order to increase the transmission efficiency of packet data in a radio channel.

An RRC layer (i.e., the third layer) functions to control a lower layer and also to exchange pieces of radio resource control information between an MS and a network. A variety of RRC states, such as an idle mode and an RRC connected mode, are defined according to the communication state of an MS. An MS may transfer between the RRC states, if necessary. Various procedures related to the management of radio resources, such as system information broadcasting, an RRC access management procedure, a multiple component carrier configuration procedure, a radio bearer control procedure, a security procedure, a measurement procedure, and a mobility management procedure (handover), are defined in the RRC layer.

A carrier aggregation (CA) supports a plurality of component carriers. The carrier aggregation is also called a spectrum aggregation or a bandwidth aggregation. An individual unit carrier aggregated by a carrier aggregation is called a Component Carrier (CC). Each CC is defined by the bandwidth and the center frequency. The carrier aggregation is introduced to support an increased throughput, prevent an increase of the expenses due to the introduction of a wide band RF (radio frequency) device, and guarantee compatibility with the existing system. For example, if five CCs are allocated as the granularity of a carrier unit having a 5 MHz bandwidth, a maximum bandwidth of 20 MHz can be supported.

CCs may be divided into a primary CC (hereinafter referred to as a PCC) and a secondary CC (hereinafter referred to as an SCC) according to whether they have been activated. The PCC is a carrier that is always activated, and the SCC is a carrier that is activated or deactivated according to a specific condition. Activation means that the transmission or reception of traffic data is being performed or in a standby state. Deactivation means that the transmission or reception of traffic data is impossible, but measurement or the transmission/reception of minimum information is possible. An MS may use only one PCC and one or more SCCs along with a PCC. A BS may allocate the PCC or the SCC or both to an MS.

The carrier aggregation may be classified into an intra-band contiguous carrier aggregation, such as that shown in FIG. 2, an intra-band non-contiguous carrier aggregation, such as that shown in FIG. 3, and an inter-band carrier aggregation, such as that shown in FIG. 4.

First, referring to FIG. 2, the intra-band contiguous carrier aggregation is formed within intra-band continuous CCs. For example, aggregated CCs, that is, a CC#1, a CC#2, a CC#3 to a CC #N are contiguous to each other.

Referring to FIG. 3, the intra-band non-contiguous carrier aggregation is formed between discontinuous CCs. For example, aggregated CCs, that is, a CC#1 and a CC#2 are spaced apart from each other by a specific frequency.

Referring to FIG. 4, the inter-band carrier aggregation is of a type in which, when a plurality of CCs exists, one or more of the CCs are aggregated on different frequency bands. For example, an aggregated CC, that is, a CC #1 exists in a band #1, and an aggregated CC, that is, a CC #2 exists in a band #2.

The number of carriers aggregated in downlink and the number of carriers aggregated in uplink may be different. A case where the number of DL CCs is identical with the number of UL CCs is called a symmetric aggregation, and a case where the number of DL CCs is different from the number of UL CCs is called an asymmetric aggregation.

Furthermore, CCs may have different sizes (i.e., bandwidths). For example, assuming that 5 CCs are used to configure a 70 MHz band, the configuration may have a form, such as 5 MHz CC (carrier #0)+20 MHz CC (carrier #1)+20 MHz CC (carrier #2)+20 MHz CC (carrier #3)+5 MHz CC (carrier #4).

A multi-carrier system hereinafter refers to a system supporting the carrier aggregation. In the multi-carrier system, the contiguous carrier aggregation or the non-contiguous carrier aggregation or both may be used. Furthermore, either the symmetric aggregation or the asymmetric aggregation may be used.

FIG. 5 shows a linkage between a DL CC (downlink component carrier) and a UL CC (uplink component carrier) in a multi-carrier system.

Referring to FIG. 5, in downlink, Downlink Component Carriers (hereinafter referred to as 'DL CC') D1, D2, and D3 are aggregated. In uplink, Uplink Component Carriers (hereinafter referred to as 'UL CC') U1, U2, and U3 are aggregated. Here, Di is the index of a DL CC, and Ui is the index of a UL CC (where i=1, 2, 3). At least one DL CC is a PCC, and the remaining CCs are SCCs. Likewise, at least one UL CC is a PCC, and the remaining CCs are SCC. For example, D1 and U1 may be PCCs, and D2, U2, D3, and U3 may be SCCs.

In an FDD system, a DL CC and a UL CC are linked to each other in a one-to-one manner. Each of pairs of D1 and U1, D2 and U2, and D3 and U3 is linked to each other in a one-to-one manner. An MS sets up pieces of linkage between the DL CCs and the UL CCs based on system information transmitted on a logical channel BCCH or an MS-dedicated RRC message transmitted on a DCCH. Each of the piece of linkage may be set up in a cell-specific way or an MS-specific way.

Only the 1:1 linkage between the DL CC and the UL CC has been illustrated in FIG. 5, but a 1:n or n:1 linkage may also be set up. Furthermore, the index of a component carrier does not comply with the sequence of the component carrier or the position of the frequency band of the component carrier.

Hereinafter, power headroom (PH) is described.

Power headroom means surplus power that may be additionally used other than power which is now being used by an MS for uplink transmission. For example, it is assumed that an MS has maximum transmission power of 10 W (i.e., uplink transmission power of an allowable range). It is also assumed that the MS is now using power of 9 W in the frequency band of 10 MHz. In this case, power headroom is 1 W because the MS can additionally use power of 1 W.

If a BS allocates a frequency band of 20 MHz to an MS, power of 9 W ⊔⊥ 2=18 W is required. If the frequency band of 20 MHz is allocated to the MS, however, the MS may not use the entire frequency band because the MS has the maximum power of 10 W, or the BS may not properly receive signals from the MS owing to the shortage of power. In order to solve the problems, the MS may report the power headroom of 1 W to the BS so that the BS can perform scheduling within the range of the power headroom. This report is called a Power Headroom Report (PHR). The power headroom $P_{PH}$ may also be called the remaining power or surplus power.

The reported power headroom may be given as in the following table.

TABLE 1

| Reported value | Measured quantity value (dB) |
|---|---|
| POWER_HEADROOM_0 | $-23 \leq PH < -22$ |
| POWER_HEADROOM_1 | $-22 \leq PH < -21$ |
| POWER_HEADROOM_2 | $-21 \leq PH < -20$ |
| POWER_HEADROOM_3 | $-20 \leq PH < -19$ |
| POWER_HEADROOM_4 | $-19 \leq PH < -18$ |
| POWER_HEADROOM_5 | $-18 \leq PH < -17$ |
| ... | ... |
| POWER_HEADROOM_57 | $34 \leq PH < 35$ |
| POWER_HEADROOM_58 | $35 \leq PH < 36$ |
| POWER_HEADROOM_59 | $36 \leq PH < 37$ |
| POWER_HEADROOM_60 | $37 \leq PH < 38$ |
| POWER_HEADROOM_61 | $38 \leq PH < 39$ |
| POWER_HEADROOM_62 | $39 \leq PH < 40$ |
| POWER_HEADROOM_63 | $PH \geq 40$ |

Referring to Table 1, the power headroom belongs to a range of −23 dB to +40 dB. If 6 bits are used to represent the power headroom, $2^6=64$ kinds of indices may be represented. The power headroom is classified into a total of 64 levels. For example, if a bit to represent the power headroom is 0 (i.e., 000000 when being represented by 6 bits), the power headroom indicates "$-23 \leq P_{PH} \leq -22$ dB".

A periodic PHR method may be used because the power headroom is frequently changed. According to the periodic PHR method, when a periodic timer expires, an MS triggers a PHR. After reporting power headroom, the MS drives the periodic timer again.

Furthermore, when a Path Loss (PL) estimate measured by an MS exceeds a certain reference value, the PHR may be triggered. The PL estimate is measured by an MS on the basis of Reference Symbol Received Power (RSRP).

Power headroom $P_{PH}$ is defined as a difference between a maximum transmission power $P_{max}$, configured in an MS, and a power $P_{estimated}$ estimated in regard to uplink transmission as in Equation 1 and is represented by dB.

$$P_{PH}=P_{max}-P_{estimated}[dB] \quad \text{[Equation 1]}$$

That is, in the maximum transmission power of an MS configured by a BS, the remainder other than the estimated power $P_{estimated}$ (i.e., the sum of transmit powers being used by CCs) becomes the $P_{PH}$ value.

For example, the estimated power $P_{estimated}$ is equal to power $P_{PUSCH}$ estimated in regard to the transmission of a Physical Uplink Shared Channel (hereinafter referred to as a PUSCH). In this case, the power headroom $P_{PH}$ may be calculated according to Equation 2.

$$P_{PH}=P_{max}-P_{PUSCH}[dB] \quad \text{[Equation 2]}$$

For another example, the estimated power $P_{estimated}$ is equal to the sum of power $P_{PUSCH}$ estimated in regard to the transmission of a PUSCH and power $P_{PUCCH}$ estimated in regard to the transmission of a Physical Uplink Control Channel (hereinafter referred to as a PUCCH). In this case, the power headroom $P_{PH}$ can be calculated by Equation 3.

$$P_{PH}=P_{max}-P_{PUCCH}-P_{PUSCH}[dB] \quad \text{[Equation 3]}$$

If the power headroom according to Equation 3 is represented by a graph in the time-frequency axis, it results in FIG. 6. FIG. 6 shows power headroom for one CC.

Referring to FIG. 6, the maximum transmission power $P_{max}$ configured in an MS consists of $P_{PH}$ 605, $P_{PUSCH}$ 610, and $P_{PUCCH}$ 615. That is, the remaining power in which the $P_{PUSCH}$ 610 and the $P_{PUCCH}$ 615 have been subtracted from $P_{max}$ is defined as the $P_{PH}$ 605. Each power is calculated for each Transmission Time Interval (TTI).

For example, assuming that a primary serving cell is a serving cell which has a UL PCC through which a PUCCH can be transmitted and a secondary serving cell cannot send a PUCCH, power headroom is defined as in Equation 2 and parameters and operations for a method of reporting the power headroom defined by Equation 3 are not defined.

Furthermore, in a primary serving cell, parameters and operations for a method of reporting the power headroom defined by Equation 3 may be defined. If an MS has to receive an uplink grant from a BS, send a PUSCH in a primary serving cell, and simultaneously send a PUCCH in the same subframe according to a predetermined rule, the MS calculates both the power headrooms according to Equation 2 and Equation 3 when a power headroom report is triggered and transmits the calculated power headrooms to a BS.

Dynamic scheduling is used to schedule uplink scheduling through several combinations of CCs. Accordingly, uplink transmission can be performed at the same time through certain combinations of CCs. In this case, the reason why power headroom in which all the certain combinations of CCs are taken into consideration rather than the power headroom of each CC is that the maximum transmission power of each MS is dependent on power headroom in which combined CCs are taken into consideration. Accordingly, power headroom when uplink transmission is performed at the same time through a plurality of CCs under dynamic scheduling, as well as power headroom according to each CC as described above, must be taken into consideration.

To this end, IPH (individual power headroom), CPH (combination power headroom), IPH information, and CPH information are first defined.

The IPH refers to power headroom which is calculated in a CC-specific way when only uplink transmission of one CC configured in an MS is performed. Furthermore, the IPH information refers to a message or control information having a specific format which is used to inform a BS of combination PH. Furthermore, to report the IPH to the BS is called an IPH report (IPHR).

The combination PH refers to power headroom which is calculated in a UE-specific way when uplink transmission through a certain combination of CCs configured in an MS is performed at the same time. Furthermore, the combination PH information refers to a message or control information having a specific format which is used to inform a BS of combination PH. Furthermore, to report the combination PH to the BS is called as a CPHR (Combination Power Headroom Report).

If uplink transmission is generated in a combination {CC1, CC2}, power headroom $PH_{COMB}$ into which both the power headroom PH1 of the CC1 and the power headroom PH2 of the CC2 are incorporated becomes a combination PH. A plurality of CCs to be used to calculate the combination PH is called a combination CC (CCC), and the combination CC may include two or more CCs.

Even in a situation including the same bandwidth and MCS and pathloss (PL), there is a great difference between individual power headrooms $IPH_{CC(i)}$ to $IPH_{CC(i+n)}$ for uplink transmission without distortion and a combination PH. If a BS increases the bandwidth for a relevant MS or raises the MCS level, the MS has to set power having an intensity which belongs to a region having severe distortion and to perform uplink transmission. Such uplink transmission may become factors to degrade reliability of a link and to greatly degrade the performance of a system. For this reason, in order for a BS to perform accurate dynamic scheduling in a multi-component carrier system, there is a need for a combination PH.

FIG. 7 is an explanatory diagram illustrating a concept of a combination PH according to an example of the present invention.

Referring to FIG. 7, it is assumed that CCs configured in an MS are CC(i) to CC(i+n). The IPH of each CC is described below. A maximum transmission power $PCC^{(i)}_{CMAX}$ for the CC(i) is calculated according to Equation 4 below.

$$P^{CC(i)}_{CMAX} = \text{Var}_{CC(i)} + \text{IPH}_{CC(i)} + P_{Tx,CC(i)} \quad \text{[Equation 4]}$$

In Equation 4, $\text{Var}_{CC(i)}$ is a variance of the CC(i), $\text{IPH}_{CC(i)}$ is the IPH of the CC(i), and $P_{Tx,CC(i)}$ is current uplink transmission power.

Next, the maximum transmission power $PCC^{(i+n)}_{CMAX}$ for the CC(i+n) is calculated according to Equation below.

$$P^{CC(i+n)}_{CMAX} = \text{Var}_{CC(i+n)} + \text{IPH}_{CC(i+n)} + P_{Tx,CC(i+n)} \quad \text{[Equation 5]}$$

Meanwhile, a maximum transmission power $P^{UE}_{CMAX}$ regarding the combinations {CC(i) to CC(i+n)} is calculated according to Equation below.

$$P^{UE}_{CMAX} = \text{CPH} + P_{Tx,CC(i)} + \ldots + P_{Tx,CC(i+n)} \quad \text{[Equation 6]}$$

Referring to Equation 6, the CPH is a combination PH regarding the combination {CC(i) to CC(i+n)}, and $P_{Tx,CC(i)}$ is the component of the CC(i) forming uplink transmission power.

FIG. 8 is a flowchart illustrating a method of transmitting PH according to an example of the present invention.

Referring to FIG. 8, an MS and a BS perform configuration on a combination CC at step S800. The combination CC is a subset of a CC set configured for the MS. For example, if the configured CC set is {CC1, CC2, CC3}, a combination CC (hereinafter referred to as a 'combination CC') may be any one of {CC1, CC2}, {CC1, CC3}, {CC2, CC3}, and {CC1, CC2, CC3}.

The combination CC exits in various ways. Accordingly, when the MS reports a combination PH to the BS, the BS must know what the combination PH is for which combination CC. To this end, prior to the report on the combination PH, a configuration on the combination CC needs to be previously performed. The configuration on the combination CC refers to a procedure of configuring a combination CC for determining 'a combination PH to be reported by the MS'.

The configuration on the combination CC may be started in response to the control signal of the MS or may be started in response to the control signal of the BS. Alternatively, the configuration on the combination CC may be performed according to rules between the MS and the BS even without additional signaling. In either case, when the configuration on the combination CC is completed, a CPHR (Combination Power Headroom Report) is performed for only a configured combination CC and a notification for additional combination CCs is not required. The MS and the BS can share information about the combination CC based on the configuration on the combination CC.

The BS transmits, to the MS, an uplink grant for allocating uplink resources that the MS will use them for a PH report at step S805. An example of the uplink grant is shown in Table 2.

TABLE 2

Flag for format0/format1A differentiation - 1 bit, where value 0 indicates format 0 and value 1 indicates format 1A
Frequency hopping flag - 1 bit

TABLE 2-continued

Resource block assignment and hopping resource allocation -
$\lceil \log_2(N_{RB}^{UL}(N_{RB}^{UL}+1)/2) \rceil$ bits
    For PUSCH hopping:
        $N_{UL\_hop}$ MSB bits are used to obtain the value of $ñ_{PRB}(i)$
          ($\lceil \log_2(N_{RB}^{UL}+1)/2) \rceil$) - $N_{UL\_hop}$) bits provide the
          resource allocation of the first slot in the UL subframe
    For non-hopping PUSCH:
        ($\lceil \log_2(N_{RB}^{UL}(N_{RB}^{UL}+1)/2) \rceil$) bits provide the resource
        allocation in the UL subframe
Modulation and coding scheme and redundancy version - 5 bits
New data indicator - 1 bit
TPC command for scheduled PUSCH - 2 bits
Cyclic shift for DM RS - 3 bits
UL index - 2 bits (this field is present only for TDD operation with uplink-downlink configuration 0)
    Downlink Assignment Index (DAI) - 2 bits (this field is present only
        for TDD operation with uplink-downlink configurations 1-6)
CQI request - 1 bit
Carrier Index Field (CIF) - 3 bits(this field is present only for
Carrier Aggregation)

Referring to Table 2, the uplink grant is information corresponding to the format 0 of Downlink Control Information (DCI) transmitted on a PDCCH, and it includes pieces of information, such as RB, a Modulation and Coding Scheme (MCS), and TPC.

If a triggering condition is satisfied, the MS triggers the PH report on the configured combination CC at step S810. The triggering condition will be described later.

Next, the MS calculates a combination PH for the configured combination CC at step S815. The combination PH may be calculated according to the methods illustrated in Equation 1 to Equation 6. If a plurality of the configured combination CCs exists, the MS calculates a combination PH for each of the plurality of configured combination CCs. For example, if the configured combination CCs include {CC1, CC2} and {CC2, CC3}, the MS calculates both the combination PH of {CC1, CC2} and the combination PH of {CC2, CC3}.

The BS may perform or may not perform scheduling for a CC belonging to the combination CC. Although the combination CC includes a non-scheduled CC, the combination PH may be calculated. For example, virtually allocated resources and a virtually determined MCS (Modulation and Coding Scheme) level for a non-scheduled CC may be determined, and a combination PH may be calculated based on the determined virtual resources and the virtual MCS level. For example, if a combination CC includes {CC1, CC2, CC3}, uplink scheduling for the CC1 and the CC2 exists, but uplink scheduling for the CC3 may not exist. A combination PH is calculated in preparation for scheduling by a BS in the future although scheduling is not performed at the present time. Accordingly, the combination PH is calculated on the basis of resources and an MCS level allocated to the CC3 by default or virtually. Accordingly, scheduling in the future can be prepared because a combination PH for a CC that has not been scheduled at the present time, but will be scheduled in the future can be calculated.

The MS transmits combination PH information, including a combination PH field, to the BS at step S820. The combination PH information may be configured in the form of a message generated in the MAC layer or a message generated in the RRC layer.

Here, the combination PH field is a field indicating the combination PH. The combination PH field is a field included in an MAC CE (control element), and the LCID (Logical Channel ID) field of an MAC sub-header may indicate that the MAC CE is for a report on the combination PH.

If a combination CC set is once configured between an MS and a BS, it is maintained semi-persistently. The MS transmits only combination PH information on the configured combination CC set for every triggering. This state remains intact until the construction of the combination CC set is reconfigured. Accordingly, the amount of the combination PH information can be constantly maintained. If the construction of the combination CC set is reconfigured, the MS transmits combination PH information about the construction of the reconfigured combination CC set.

The BS performs uplink scheduling on the basis of the combination PH information received from the MS at step S825.

If the construction of the combination CC set is configured, information about a combination CC needs not to be exchanged between the MS and the BS. Accordingly, a burden on uplink signaling is reduced because the MS transmits only combination PH information about the configured combination CC.

Furthermore, the MS has only to transmit only the combination PH information about the configured combination CC and does not need to transmit a combination PH for all the combination CCs. Accordingly, uplink resources used to report the combination PH can also be reduced.

The procedures performed between the MS and the BS in FIG. 8 are hereinafter sequentially described in detail. First, a configuration on a combination CC is described. A method of configuring the combination CC is chiefly divided into two kinds of cases. One of the cases is a case where there is no additional signaling indicating the combination CC (hereinafter referred to as Case A), and the other of the cases is a case where there is additional signaling indicating the combination CC (hereinafter referred to as Case B).

FIG. 9 is a flowchart illustrating a method of configuring a combination CC according to an example of the present invention. This method is a method of configuring a combination CC according to Case A.

Referring to FIG. 9, a BS transmits CC configuration information to an MS at step S900. The CC configuration information includes configured CC group information. The configured CC group refers to a group of CCs configured so that the MS can use the configured CCs, from among a plurality of CCs. The configured CC group information indicates a group of configured CCs. For example, if a group of supportable CCs include {CC1, CC2, CC3, CC4, CC5}, a configured CC group may be {CC1, CC2, CC3}.

The CC configuration information may be an RRC message. For example, the CC configuration information is a message which is used in an RRC connection establishment procedure, an RRC connection re-establishment procedure, or an RRC connection reconfiguration procedure. Alternatively, the CC configuration information may be an MAC message or the message of a physical layer.

The MS transmits a response message, indicating that the CC configuration information has been successfully received, to the BS at step S905. The response message may be at least one of an RRC message, an MAC message, and a physical layer message. The response message may also be called an ACK message. A candidate CC group is determined based on the response message. The candidate CC group is a group of candidate CCs which will be included in a combination CC. The candidate CC group is the same as the configured CC set. Accordingly, in the above example, the candidate CC group is {CC1, CC2, CC3}.

The MS or the BS or both determine combination CCs using the candidate CC group at step S910. All the combination CCs determined from the candidate CC group {CC1, CC2, CC3} include {CC1, CC2}, {CC1, CC3}, {CC2, CC3}, and {CC1, CC2, CC3}. That is, even though there is no additional explicit signaling indicating a combination CC between the MS and the BS, a combination CC group can be obtained implicitly. The MS or the BS or both perform a CPHR procedure on the basis of the determined combination CC group. Combination PH information includes a combination PH value for each of the combination CCs. The determination of the combination CCs according to the candidate CC group is maintained unless the candidate CC group is changed according to the reconfiguration of the construction of the combination CCs. It means that a CPHR on the same combination CCs is performed semi-persistently. For example, if a combination PH field regarding one combination CC is 6 bits, a combination PH field for n combination CCs is a total of 6n bits. Accordingly, combination PH information including the combination PH field of 6n bits is transmitted semi-persistently until the combination CC configuration is reconfigured.

FIG. 10 is a flowchart illustrating a method of configuring a combination CC according to another example of the present invention. This method is a method of configuring a combination CC according to Case B.

Referring to FIG. 10, a BS transmits CC configuration information to an MS at step S1000. The CC configuration information includes information about a configured CC group.

The CC configuration information may be an RRC message. For example, the CC configuration information is a message which is used in an RRC connection establishment procedure, an RRC connection re-establishment procedure, or an RRC connection reconfiguration procedure.

The MS transmits information about a candidate CC group to the BS at step S1005. The information about a candidate CC group indicates a candidate CC group. The candidate CC group is a subset of the configured CC group. For example, the configured CC group may be {CC1, CC3, CC4, CC5}, and the candidate CC group may be {CC1, CC4, CC5}. The candidate CC group is selected by the MS. As an example of a criterion that the MS selects the candidate CC group, the MS may select the candidate CC group on the basis of the amount of a variance of a combination PH. For example, the candidate CC group may vary according to whether the configured CCs have been implemented into one RF or different RFs.

The information about a candidate CC group may have at least one of forms of a message generated in the MAC layer, a message generated in the RRC layer, and a message generated in the physical layer. In particular, if the information about a candidate CC group is the RRC message, the information about a candidate CC group may be included as additional information within the RRC message which is used in a process of transferring an MS capability to the BS. Alternatively, the information about a candidate CC group may be included as additional information within the RRC message which is used in a process of transferring MS information.

The BS transmits a confirmation message, indicating that the information about a candidate CC group has successfully been received, to the MS at step S1010. The confirmation message may be composed of at least one of an RRC message, an MAC message, and a physical layer message. A candidate CC group is confirmed based on the confirmation message. In this example, the candidate CC group is {CC1, CC4, CC5}.

The MS or the BS or both determine a combination CC using the candidate CC group at step S1015. All combination CCs determined from the candidate CC group {CC1, CC4, CC5} are {CC1, CC4}, {CC1, CC5}, {CC4, CC5}, and {CC1, CC4, CC5}.

Unlike the method according to Case A, in the method according to Case B, a combination CC is determined based on the information about a candidate CC group which is additional explicit signaling indicating the combination CC between an MS and a BS.

In the method according to Case A, additional signaling is not necessary because a candidate CC group is implicitly defined using only a CC configuration. Furthermore, a CPHR on all combination CCs is performed. On the other hand, the method according to Case B requires additional signaling for informing information about a candidate CC group. Furthermore, this method can reduce the amount of combination PH information because a candidate CC group rather than a configured CC group is limited.

FIG. 11 is a flowchart illustrating a method of transmitting combination PH information according to an example of the present invention.

Referring to FIG. 11, first, a configuration on a combination CC is completed between an MS and a BS at step S1100. Here, the configured combination CC includes {CC1, CC2} and {CC2, CC3}.

When a PH report is triggered at step S1105, the MS transmits first combination PH information v1 to the BS at step S1110. The first combination PH information v1 indicates that it is a first version. The first combination PH information indicates both a combination PH for the combination {CC1, CC2} and a combination PH for the combination {CC2, CC3}. When triggering is generated after a lapse of some time at step S1115, the MS transmits first combination PH information v2 of a second version, newly generated in regard to the configured combination CC, to the BS at step S1120. When triggering is generated after a lapse of time at step S1125, the MS transmits first combination PH information v2 of a third version, newly generated in regard to the configured combination CC, to the BS at step at step S1130.

If the configuration on the combination CC is changed (i.e., when the construction of the combination CC group is reconfigured) after a lapse of some time at step S1135, when triggering is subsequently generated at step S1140, the MS calculates a combination PH according to the reconfigured combination CC {CC3, CC4}, {CC3, CC5}, and {CC4, CC5} and transmits second combination PH information v1 to the BS at step S1145.

The value of power headroom of the first combination PH information is changed according to the version, but the amount of the first combination PH information is fixed until step S1130. For example, the first combination PH information consistently includes a combination PH value for two combination CCs. Meanwhile, the second combination PH information consistently includes a combination PH value for three combination CCs. When a combination CC is once configured between an MS and a BS as described above, the MS transmits changed combination PH information regarding a configured combination CC in the state in which a combination CC group is semi-persistently maintained for every triggering. This state remains intact until the construction of the combination CC is reconfigured.

A condition that a CPHR is triggered is described below.

FIG. 12 is a flowchart illustrating a triggering condition on a CPHR according to an example of the present invention. This is called triggering according to a CC configuration.

Referring to FIG. 12, an MS configures or reconfigures CCs according to the instruction of a BS at step S1200. In general, the BS calculates uplink resources necessary for the MS by taking SR (scheduling request) information, BSR (buffer state report) information, and so on, received from the MS, into consideration. Furthermore, the BS calculates the number of CCs and a CC combination which will be configured for the MS by taking resources available for the BS, a network policy, etc. into account.

For example, if the number of CCs to be configured for an MS is 3 and the CCs are No. 1 to No. 5, a BS may select a CC combination to be configured for the MS, including three CCs selected from among the five CCs, such as {CC1, CC2, CC3} or {CC1, CC3, CC5}. However, the BS may change the number of CCs, indices, a band, and a combination, configured to the MS, according to circumstances. Accordingly, when the BS instructs the configuration or reconfiguration of CCs regarding the MS, the MS configures or reconfigures the CCs according to the instruction. The configuration or reconfiguration of the CCs is instructed through a RRC connection establishment procedure, an RRC connection re-establishment procedure, or an RRC connection reconfiguration procedure.

According to the configuration or reconfiguration of the CCs, the MS triggers a CPHR at step S1205. If the CCs are combined, only a CPHR on a combination CC whose combination PH or variance is determined to be a threshold or higher is triggered.

FIG. 13 is a flowchart illustrating a triggering condition on a CPHR according to another example of the present invention. This is called triggering according to a timer.

Referring to FIG. 13, an MS drives a CPHR (Combination Power Headroom Report) timer at step S1300. The CPHR timer may be periodically driven because a combination PH is frequently changed. For example, if a New Data Indicator (NDI) included in an uplink grant indicates new transmission, a CPHR timer may be driven.

The MS determines whether the CPHR timer has expired at step S1305. If, as a result of the determination, the CPHR timer is determined to have expired, the MS triggers the CPHR at step S1310). If, as a result of the determination, the CPHR timer is determined not to have expired, the MS waits until the CPHR timer expires.

The CPHR timer is operated separately from an IPHR (individual power headroom report) timer.

Meanwhile, the MS may receive a timer value for setting the CPHR timer from the BS through RRC signaling. The timer value may be applied to an IPHR timer and, likewise, may also be applied to the CPHR timer. Furthermore, the MS may receive an additional timer value for the CPHR timer from the BS through RRC signaling.

For example, the time when the IPHR timer is driven may be different from the time when the CPHR timer is driven. Alternatively, the IPHR timer and the CPHR timer may be driven at the same time. Here, a value set in the IPHR timer and a value set in the CPHR timer may be identical with each other or different from each other.

FIG. 14 is a flowchart illustrating a triggering condition on a CPHR according to yet another example of the present invention. This is called triggering according to an individual CC.

Referring to FIG. 14, an MS determines whether an IPHR regarding a specific CC has been triggered at step S1400. If, as a result of the determination, the IPHR regarding the specific CC is determined to have been triggered, the MS triggers a CPHR regarding all combination CCs at step S1405. That is, the triggering of the CPHR is induced by the IPHR.

FIG. 15 is a flowchart illustrating a triggering condition on a CPHR according to still yet another example of the present invention. This is called triggering according to scaling.

Referring to FIG. 15, an MS determines whether Transmission Power Scaling (TPS) has occurred for every combination CC at step S1500. Here, the TPS means an operation of the MS reducing uplink transmission power when the maximum uplink transmission power of the MS is exceeded owing to dynamic scheduling according to a BS. When the TPS is generated, a combination PH has a negative value smaller than 0 dB.

If, as a result of the determination, the TPS is determined not to have been generated in regard to a specific combination CC, the MS determines whether TPS has occurred at step S1500. If, as a result of the determination, the TPS is determined to have been generated in regard to a specific combination CC, the MS increase a Scaling Count (SC) by 1 at step S1505. The SC is operated for every combination CC. For example, a first SC may be applied to a first combination CC, and a second SC may be applied to a second combination CC.

Next, the MS determines whether the SC is equal to a maximum SC value $SC_{max}$ at step S1510. The maximum SC value may be transmitted to the MS in the form of high layer signaling, such as RRC signaling, an MAC message, or a message of a physical layer level. A BS may control the frequency of combination PHR triggering by controlling the maximum SC value according to a communication condition. This is because frequent triggering may become overhead. For example, the maximum SC value may be 5 to 7. An issue of implementation is how the maximum SC value is determined.

If, as a result of the determination, the SC of a specific combination CC is determined to be equal to the maximum SC value $SC_{max}$, the MS triggers the CPHR of all combination CCs at step S1515. After the CPHR is triggered and the CPHR is completed, the SC is reset and counting is newly started.

If, as a result of the determination, the SC of a specific combination CC is determined not to be equal to the maximum SC value $SC_{max}$, the MS determines whether TPS has occurred at step S1500.

In this specification, the several methods of CPHR triggering are described. That is, the CPHR triggering includes triggering according to a CC configuration, triggering according to a timer, and triggering according to an individual CC.

Furthermore, the triggering methods may be independently applied to CPHRs or one or more of the triggering methods may be combined and applied. If all the triggering methods are applied, the triggering according to a CC configuration, the triggering according to a timer, and the triggering according to an individual CC may be applied in this order.

Furthermore, if the triggering methods are combined and applied, an MS may perform a PHR (power headroom report) using a triggering sequence different from the above triggering sequence according to rules previously agreed with a system.

Combination PH information is described in detail below.

For example, the combination PH information may be a control message generated in the RRC layer. When a combination CC is configured, an MS may configure combination PH information in which combination PHs are sequentially arranged for every configured combination CC in the form of an RRC message. Here, the sequence of combination PH values within the combination PH information may be known to both an MS and a BS.

For another example, the combination PH information may be a control message generated in the MAC layer.

FIG. 16 shows the architecture of an MAC PDU including combination PH information according to an example of the present invention. The MAC PDU is also called a Transport Block (TB).

Referring to FIG. 16, the MAC PDU 1600 includes an MAC header 1610, one or more MAC CEs (control elements) 1620 to 1625, one or more MAC SDUs (Service Data Unit) 1630-1 to 1630-$m$, and padding 1640.

The MAC CEs 1620 and 1625 are control messages generated in the MAC layer.

The MAC SDUs 1630-1 to 1630-$m$ are RLC PDUs transferred from an RLC layer. The padding 1640 is a specific number of bits which are added to make constant the size of the MAC PDU. The MAC CEs 1620 to 1625, the MAC SDUs 1630-1 to 1630-$m$, and the padding 1640 are collectively called an MAC payload.

The MAC header 1610 includes one or more sub-headers 1610-1 to 1610-$k$. Each of the sub-headers 1610-1 to 1610-$k$ corresponds to one MAC SDU, one MAC CE, or padding. The sequence of the sub-headers 1610-1 to 1610-$k$ is the same as the sequence of the MAC SDUs, the MAC CEs, or the padding within the MAC PDU 1600.

Each of the sub-headers 1610-1 to 1610-$k$ may include four fields R, R, E, and LCID or six fields R, R, E, LCID (Logical Channel ID), F, and L. The sub-header including the four fields corresponds to an MAC CE or padding. The sub-header including the six fields corresponds to an MAC CE or an MAC SDU whose length has not been defined by only 1 octet.

The LCID field is an identification field for identifying a logical channel, corresponding to an MAC SDU, or for identifying an MAC CE or the type of padding. The LCID field may have 5 bits.

For example, the LCID field is mapped to an MAC CE, and it indicates the type or function of the mapped MAC CE. For example, the LCID field identifies whether a mapped MAC CE is for a CPH report or IPH information, whether the mapped MAC CE is for a feedback request MAC CE requesting feedback information from an MS, whether the mapped MAC CE is for a DRX (Discontinuous Reception) command MAC CE regarding a non-continuous reception command, or whether the mapped MAC CE is for a contention resolution identity MAC CE for a contention solution between MSs in a random access procedure. One LCID field exists in regard to each of the MAC SDU, the MAC CE, or the padding. Table 3 is an example of the LCID field.

TABLE 3

| Index | LCID values |
|---|---|
| 00000 | CCCH |
| 00001-01010 | Identity of logical channel |
| 01011-10101 | Reserved |
| 10110 | UL activation/deactivation |
| 10111 | DL activation/deactivation |
| 11000 | Reference CC Indicator |
| 11001 | Individual Power Headroom Report (IPHR) |
| 11010 | Combination Power Headroom Report (CPHR) |
| 11011 | C-RNTI |
| 11100 | Truncated BSR |
| 11101 | Short BSR |
| 11110 | Long BSR |
| 11111 | Padding |

Referring to Table 3, if the LCID field is 11001, it means that a relevant MAC CE indicates an MAC CE for an IPHR. If the LCID field is 11010, it means that a relevant MAC CE is for an MAC CE for a CPHR.

FIG. 17 shows the architecture of an MAC PDU including combination PH information according to another example of the present invention. The combination PH information includes an LCID field within an MAC sub-header and a combination PH field within an MAC CE.

Referring to FIG. 17, the MAC PDU 1700 includes an MAC header 1705, an MAC CE 1760, MAC SDUs 1750, and padding 1755.

The MAC header 1705 includes an i number of MAC sub-headers 1705-1 to 1705-$i$. The MAC sub-header 1705-$i$ includes Reserved (R) fields 1710, an E field 1715, and an LCID field 1720. The LCID field 1720 is the same as that shown in Table 3.

The E field 1715 is an extension field indicating whether an additional LCID field exists in the MAC sub-headers 1705-1 to 1705-$i$. The R fields 1710 are redundant bits in the MAC sub-header 1705-$i$.

Meanwhile, the MAC CE 1760 includes one or more consecutive PH (power headroom) octets 1735-1 to 1735-$k$. Each of the PH octets 1735-1 to 1735-$k$ includes an R field and a CPHF (combination power headroom field). For example, the $k^{th}$ PH octet 1735-$k$ includes the R field 1740 and the $k^{th}$ $CPHF_k$ 1745. A combination PH indicated by each CPHF may be determined within the range, such as Table 1. Each of the PH octets 1735-1 to 1735-$k$ is 8 bits. 6 bits of the 8 bits may be allocated to the CPHF, and the remaining 2 bits thereof may be allocated to the R field. This is a structure compatible with the existing system, and octets having the same structure are combined to form one MAC CE. For example, it is assumed that combination PH information for five combination CCs is constructed. One PH octet is necessary for every combination CC, and one PH octet has 8 bits. Accordingly, a total of 8 (bits/octet)×5 (octets)=40 bits are required to construct the combination PH information.

Here, the sequence of the PH octets disposed in the MAC CE 1760 is not necessarily fixed. However, both an MS and a BS have only to know the sequence of a plurality of CPHFs disposed within the one MAC CE 1760. For example, it is assumed that combination CCs obtained through the configured CC group (Case A) or the candidate CC group (Case B) are a first combination CC, a second combination CC, and a third combination CC. An MS calculates a first combination PH regarding the first combination CC, a second combination PH regarding the second combination CC, and a first combination PH regarding the third combination CC and generates a first CPHF indicating the first combination PH, a second CPHF indicating the second combination PH, and a third CPHF indicating the third combination PH. Furthermore, the MS generates a first PH octet, a second PH octet, and a third PH octet, including the first, the second, and the third CPHFs, respectively, and finally constructs the MAC CE.

The MS constructs the MAC PDU according to the sequence also known to the BS. The PH octets are disposed according to the same sequence as the sequence of implicitly corresponding combination CCs. For example, the MS may construct the MAC CE so that the first, the second, and the third PH octets are sequentially disposed. The sequence of the PH octets disposed within the MAC PDU is previously agreed between the BS and the MS.

FIG. 18 shows the architecture of an MAC PDU including combination PH information according to yet another example of the present invention. The combination PH information includes an LCID field within an MAC sub-header and a CPHF within an MAC CE.

Referring to FIG. 18, the MAC PDU 1800 includes an MAC header 1805, an MAC CE 1860, MAC SDUs 1850, and padding 1855.

The MAC header 1805 includes an i number of MAC sub-headers 1805-1 to 1805-*i*. The MAC sub-header 1805-*i* includes R fields 1810, an E field 1815, and an LCID field 1820. The LCID field 1820 is the same as that shown in Table 3.

The E field 1815 is an extension field indicating whether an additional LCID field exists in the MAC sub-headers 1805-1 to 1805-*i*. The R fields 1810 are redundant bits in the MAC sub-header 1805-*i*.

Meanwhile, the MAC CE 1860 includes an R field 1840 and one or more CPHF 1835-1 to 1835-*k*. The MAC CE 1860 is an integer multiple of an octet Oct. The octet indicates a unit of an 8 bit-length on the MAC PDU. Accordingly, the number of bits of the R field 1840 is controlled so that the MAC CE 1860 becomes an integer multiple of the octet. For example, if k=3 and there are three CPHFs 1835-1, 1835-2, and 1835-3 each having 6 bits, the total number of bits is 6 (bits/CPHF×3 (CPHFs)=18 bits. However, the total number of bits has to be at least 24 bits because the MAC CE 1860 must be an integer multiple of the octet. Accordingly, the R field 1840 is 24−18=6 bits. For another example, if there are five CPHFs 1835-1 to 1835-5 each having 6 bits, the total number of bits is 6 (bits/CPHF)×5 (CPHFs)=30 bits. However, the total number of bits has to be at least 32 bits because the MAC CE 1860 must be an integer multiple of the octet. Accordingly, the R field 1840 is 32−30=2 bits.

A combination PH indicated by each CPHF may be determined within the range, such as that shown in Table 1.

The sequence of the CPHFs 1835-1 to 1835-*k* disposed within the MAC CE 1860 is not necessarily fixed. However, both an MS and a BS have only to know the sequence of a plurality of CPHFs disposed within one MAC CE 1860. For example, it is assumed that combination CCs obtained through the configured CC group (Case A) or the candidate CC group (Case B) are a first combination CC, a second combination CC, and a third combination CC. The MS calculates a first combination PH regarding the first combination CC, a second combination PH regarding the second combination CC, and a third combination PH regarding the third combination CC and generates a first CPHF indicating the first combination PH, a second CPHF indicating the second combination PH, and a third CPHF indicating the third combination PH. Furthermore, the MS constructs the MAC CE using an R field and the first, the second, and the third CPHFs.

The MS constructs the MAC PDU according to the sequence also known to the BS. The CPHFs are disposed according to the same sequence as the sequence of implicitly corresponding combination CCs. For example, the MS may construct the MAC CE so that the first, the second, and the third CPHFs are sequentially disposed. The sequence of the CPHFs disposed within the MAC PDU is previously agreed between the BS and the MS.

FIG. 19 is a block diagram showing an MS for transmitting combination PH information and a BS for receiving combination PH information according to an example of the present invention.

Referring to FIG. 19, the MS 1900 includes a message reception unit 1905, a combination CC generation unit 1910, a triggering unit 1915, a combination PH calculation unit 1920, a combination PH information generation unit 1925, and a message transmission unit 1930.

The message reception unit 1905 receives an uplink grant or CC configuration information from a BS 1950. The CC configuration information includes information about a configured CC group. The CC configuration information may be an RRC message. For example, the CC configuration information is a message which is used in an RRC connection establishment procedure, an RRC connection re-establishment procedure, or an RRC connection reconfiguration procedure. Alternatively, the CC configuration information may be an MAC message or a physical layer message.

The combination CC generation unit 1910 generates a group of combination CCs on the basis of the configured CC group. For example, the combination CC generation unit 1910 may generate all possible combination CCs in the configured CC group. For example, if the configured CC group includes {CC1, CC2, CC3, CC4}, the combination CC generation unit 1910 may generate all possible combinations {CC1, CC2}, {CC1, CC3}, {CC1, CC4}, {CC2, CC3}, {CC2, CC4}, {CC3, CC4}, {CC1, CC2, CC3}, {CC1, CC2, CC4}, {CC1, CC3, CC4}, {CC2, CC3, CC4}, and {CC1, CC2, CC3, CC4} from the configured CC group.

For another example, the combination CC generation unit 1910 may configure some CCs, extracted from the configured CC group, as a candidate CC group and generate all possible combination CCs from the candidate CC group. For example, if the configured CC group includes {CC1, CC2, CC3, CC4}, the combination CC generation unit 1910 may configure {CC1, CC3, CC4} of the configured CC group as a candidate CC group and generate all possible combinations {CC1, CC3}, {CC1, CC4}, {CC3, CC4}, and {CC1, CC3, CC4} from the candidate CC group {CC1, CC3, CC4}.

The triggering unit 1915 triggers a CPHR on the basis of a specific triggering condition. CPHR triggering methods, as described above, include triggering according to a CC configuration, triggering according to a timer, triggering according to an individual CC, and triggering according to scaling. The triggering unit 1915 may use the CPHR triggering methods independently or use two or more of the CPHR triggering methods in combination.

The combination PH calculation unit 1920 calculates a combination PH regarding the combination CC, generated by the combination CC generation unit 1910, in response to the triggering of the triggering unit 1915. For example, the combination PH calculation unit 1920 may calculate the combination PH in accordance with Equation 1 to Equation 6.

The combination PH information generation unit 1925 generates combination PH information on the basis of the combination PH calculated by the combination PH calculation unit 1920. The combination PH information includes a CPHF, and the value of the CPHF may be calculated on the basis of Table 1. The CPHF may be included in an MAC PD as in the examples of FIGS. 16 to 18.

The message transmission unit 1930 transmits the combination PH information, generated by the combination PH information generation unit 1925, to the BS 1950 in the form of an RRC message or an MAC message in response to the uplink grant received from the message reception unit 1905. Furthermore, the message transmission unit 1930 transmits information about the candidate CC group, generated by the combination CC generation unit 1910, to the BS 1950.

The BS 1950 includes a message generation unit 1955, a message transmission unit 1960, a combination CC generation unit 1965, a message reception unit 1970, and an uplink scheduler 1975.

The message generation unit 1955 generates CC configuration information including a CC group configured for the MS 1900.

The message transmission unit 1960 transmits the CC configuration information, generated by the message generation unit 1955, to the MS 1900. Furthermore, the message transmission unit 1960 transmits an uplink grant, generated by the uplink scheduler 1975, to the MS 1900.

The combination CC generation unit 1965 generates all possible combination CCs or a combination CC group necessary for a CPHR on the basis of the configured CC group or on the basis of a candidate CC group received by the message reception unit 1970.

The message reception unit 1970 receives information about the candidate CC group from the MS 1900. Furthermore, the message reception unit 1970 receives combination PH information from the MS 1900.

The uplink scheduler 1975 performs dynamic uplink scheduling within the range of the maximum uplink transmission power of the MS 1900 on the basis of the combination PH information received by the message reception unit 1970. Furthermore, the uplink scheduler 1975 generates the uplink grant and transmits it to the message transmission unit 1960.

While some exemplary embodiments of the present invention have been described with reference to the accompanying drawings, those skilled in the art may change and modify the present invention in various ways without departing from the essential characteristic of the present invention. Accordingly, the disclosed embodiments should not be construed to limit the technical spirit of the present invention, but should be construed to illustrate the technical spirit of the present invention. The scope of the technical spirit of the present invention is not restricted by the embodiments, but should be interpreted based on the following claims. Accordingly, all technical spirits within an equivalent range should be interpreted as being included in the scope of the present invention.

The invention claimed is:

1. A method of transmitting power headroom information in a multi-component carrier system using a user equipment, the method comprising:
    configuring a plurality of component carriers combined from a candidate component carrier group based on component carrier configuration information;
    triggering a power headroom report on the plurality of combined component carriers;
    calculating power headroom for the plurality of combined component carriers; and
    transmitting, to a eNodeB, combination power headroom information including a value of the calculated power headroom;
    determining whether the user equipment reduces uplink transmission power when maximum uplink transmission power of the user equipment is exceeded owing to dynamic scheduling according to the eNodeB;
    increasing a scaling count by 1 when the uplink transmission power is reduced; and
    determining whether the scaling count is equal to a predefined maximum scaling count,
    wherein the power headroom report on the plurality of combined component carriers is triggered when the power headroom for the plurality of combined component carriers is greater than or equal to a predefined threshold, and
    wherein the power headroom report on the plurality of combined component carriers is triggered when the scaling count is equal to the predefined maximum scaling count.

2. The method of claim 1, further comprising:
    generating a combination power headroom report timer; and
    determining whether the combination power headroom report timer is expired,
    wherein the power headroom report on the plurality of combined component carriers is triggered when the combination power headroom report timer is expired.

3. The method of claim 1, further comprising:
    determining whether each of power headroom reports on specific component carriers among the plurality of component carriers is triggered;
    wherein the power headroom report on the plurality of combined component carriers is triggered when one of the power headroom reports on specific component carriers among the plurality of component carriers is triggered.

4. The method of claim 1, wherein an amount of the combination power headroom information transmitted whenever triggering is generated until a construction of the plurality of combined component carriers is reconfigured is identical.

5. The method of claim 1, further comprising:
    receiving the component carrier configuration information on a configured component carrier group from the eNodeB.

6. The method of claim 1, wherein the combination power headroom information comprises combination power headroom fields, and
    each of the combination power headroom fields indicates a value of power headroom regarding one of the combined component carriers.

7. The method of claim 1, wherein the combination power headroom information is included in a message generated in a Medium Access Control layer.

8. The method of claim 1, wherein the component carrier configuration information is included in a message generated in a Radio Resource Control layer.

9. A method of receiving power headroom information in a multi-component carrier system using a base station, the method comprising:
    transmitting, to the mobile station, component carrier configuration information regarding a component carrier group configured in a mobile station;
    determining combined component carriers from a candidate component carrier group which is a subset of the configured component carrier group; and
    receiving, from the mobile station, combination power headroom information including a value of power headroom regarding the combined component carriers,
    wherein an amount of the combination power headroom information transmitted whenever triggering is generated is identical until a construction of a plurality of the combined component carriers is reconfigured,
    wherein the mobile station determines whether the mobile station reduces uplink transmission power when maximum uplink transmission power of the mobile station is exceeded owing to dynamic scheduling according to the base station, increases a scaling count by 1 when the uplink transmission power is reduced, determines whether the scaling count is equal to a predefined maximum scaling count, and triggers a power headroom report on the plurality of combined component carriers when the scaling count is equal to the predefined maximum scaling count.

10. The method of claim 9, wherein the configured component carrier group is identical with the candidate component carrier group.

11. The method of claim 9, further comprising receiving information about the candidate component carrier group from the mobile station.

12. The method of claim 9, wherein:
    the combination power headroom information is included in an Media Access Control (MAC) Protocol Data Unit (PDU), the MAC PDU comprises an MAC sub-header and an MAC Control Element (CE), and a Logical Channel Identifier of the MAC sub-header indicates that the MAC CE includes a value of power headroom regarding the combination component carrier.

13. The method of claim 12, wherein a size of the MAC CE is an integer multiple of an octet.

14. The method of claim 12, wherein the MAC CE includes one Reserved field and one or more combination power headroom fields.

15. A user equipment, comprising:

a message reception unit to receive component carrier configuration information or an uplink grant from a eNodeB;

a combination component carrier generation unit to generate a combination component carrier from the component carrier configuration information;

a triggering unit to trigger a combination power headroom report regarding the combination component carrier based on a triggering condition;

a combination power headroom calculation unit to calculate combination power headroom regarding the combination component carrier;

a combination power headroom information generation unit to generate combination power headroom information having an identical amount whenever triggering is generated until a construction of the combination component carrier is reconfigured based on the calculated combination power headroom; and a message transmission unit to transmit the generated combination power headroom information to the eNodeB in a form of an RRC message or an MAC message based on the uplink grant, wherein the user equipment determines whether the user equipment reduces uplink transmission power when maximum uplink transmission power of the user equipment is exceeded owing to dynamic scheduling according to the eNodeB, increases a scaling count by 1 when the uplink transmission power is reduced, determines whether the scaling count is equal to a predefined maximum scaling count, and triggers the combination power headroom report on a plurality of combination component carriers when the scaling count is equal to the predefined maximum scaling count.

16. A eNodeB, comprising:

a message generation unit to generate component carrier configuration information including a component carrier group configured in a user equipment;

a message transmission unit to transmit the component carrier configuration information or an uplink grant to the user equipment;

a combination component carrier generation unit to generate all possible cases of combination component carriers based on the configured component carrier group or based on a candidate component carrier group;

a message reception unit to receive information about the candidate component carrier group and combination power headroom information about the combination component carrier from the user equipment; and an uplink scheduler to generate the uplink grant according to dynamic uplink scheduling for the user equipment based on the combination power headroom information, wherein the user equipment determines whether the user equipment reduces uplink transmission power when maximum uplink transmission power of the user equipment is exceeded owing to dynamic scheduling according to the eNodeB, increases a scaling count by 1 when the uplink transmission power is reduced, determines whether the scaling count is equal to a predefined maximum scaling count, and triggers a power headroom report on a plurality of combination component carriers when the scaling count is equal to the predefined maximum scaling count.

* * * * *